(12) United States Patent　　　(10) Patent No.:　　US 12,633,861 B2

Matsumoto　　　　　　　　　　　　　(45) Date of Patent:　　　May 19, 2026

---

(54) POWER SUPPLY CONTROL DEVICE AND POWER SUPPLY CONTROL METHOD

(71) Applicant: DENSO TEN Limited, Kobe (JP)

(72) Inventor: Takeshi Matsumoto, Kobe (JP)

(73) Assignee: DENSO TEN LIMITED, Kobe (JP)

( * ) Notice:　Subject to any disclaimer, the term of this patent is extended or adjusted under 35 U.S.C. 154(b) by 22 days.

(21) Appl. No.: 18/390,003

(22) Filed: Dec. 20, 2023

(65) Prior Publication Data

US 2024/0223120 A1　　Jul. 4, 2024

(30) Foreign Application Priority Data

Dec. 28, 2022　(JP) ................................. 2022-212567

(51) Int. Cl.
| | |
|---|---|
| *H02P 29/024* | (2016.01) |
| *B60R 16/033* | (2006.01) |
| *H02J 7/14* | (2006.01) |
| *H02J 105/37* | (2026.01) |

(52) U.S. Cl.
CPC .......... *H02P 29/024* (2013.01); *B60R 16/033* (2013.01); *H02J 7/1423* (2013.01); *H02J 2105/37* (2026.01)

(58) Field of Classification Search
None
See application file for complete search history.

(56) References Cited

U.S. PATENT DOCUMENTS

| | | | |
|---|---|---|---|
| 2019/0071039 A1* | 3/2019 | Tsukamoto | ......... H02J 7/00304 |
| 2021/0276425 A1* | 9/2021 | Gauthier | .............. H02J 7/0063 |
| 2022/0263323 A1* | 8/2022 | Hakushima | .......... B60R 16/033 |
| 2022/0368153 A1* | 11/2022 | Hakushima | .......... H02J 7/0031 |
| 2025/0183694 A1* | 6/2025 | Masuda | ................. H02J 9/061 |

FOREIGN PATENT DOCUMENTS

JP　　　　2022-125004 A　　　8/2022

* cited by examiner

*Primary Examiner* — Rexford N Barnie
*Assistant Examiner* — Aqeel H Bukhari
(74) *Attorney, Agent, or Firm* — Oliff PLC

(57)　　　　　ABSTRACT

A power supply control device includes: a connection device provided in an inter-system line that connects a first system and a second system; and a controller configured to control the connection device. The controller is configured to control the connection device to cut off the inter-system line in response to a power supply failure of the first system or the second system being detected, execute a confirmation process for confirming a failed system based on changes in voltages of the first system and the second system in a first period, and execute, in a case where the failed system cannot be confirmed in the confirmation process, an estimation process for estimating, as an abnormal system, a system with a greater possibility to be abnormal, based on changes in voltages of the first system and the second system in a second period longer than the first period.

4 Claims, 22 Drawing Sheets

*FIG. 5*

| PATTERN | (1) | (2) | (3) | (4) | (5) | (6) |
|---|---|---|---|---|---|---|
| FIRST SYSTEM | CONFIRMED | UNCONFIRMED | GROUND FAULT | UNCONFIRMED | NORMAL | UNCONFIRMED |
| SECOND SYSTEM | CONFIRMED | UNCONFIRMED | UNCONFIRMED | GROUND FAULT | UNCONFIRMED | NORMAL |

(CONT.)

(FIG. 8 CONTINUED)
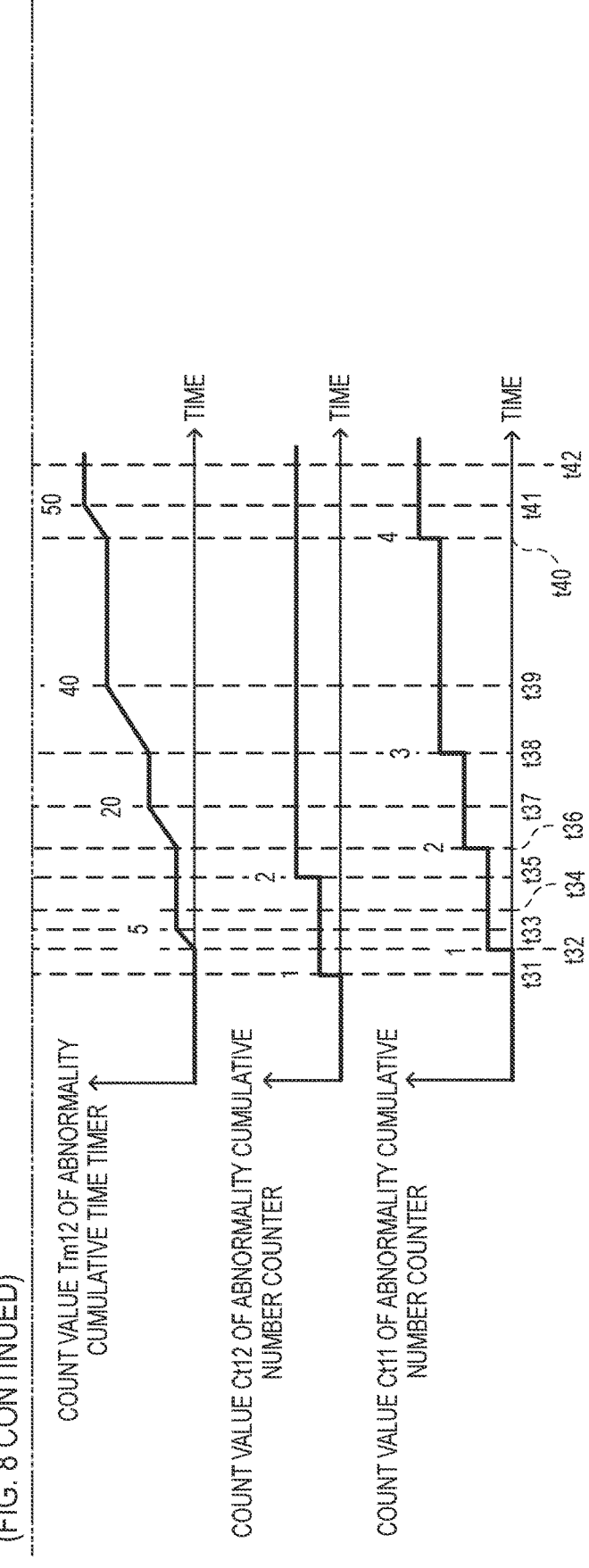

(CONT.)

(FIG. 9 CONTINUED)
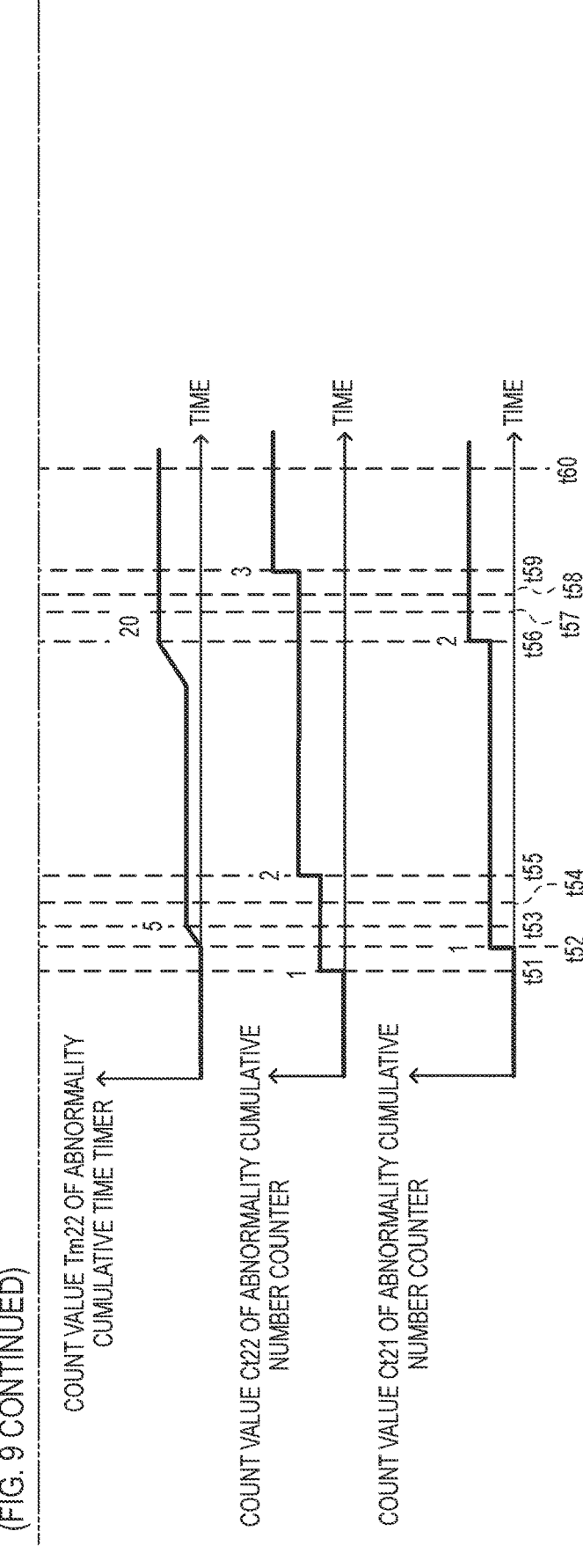

*FIG. 17*

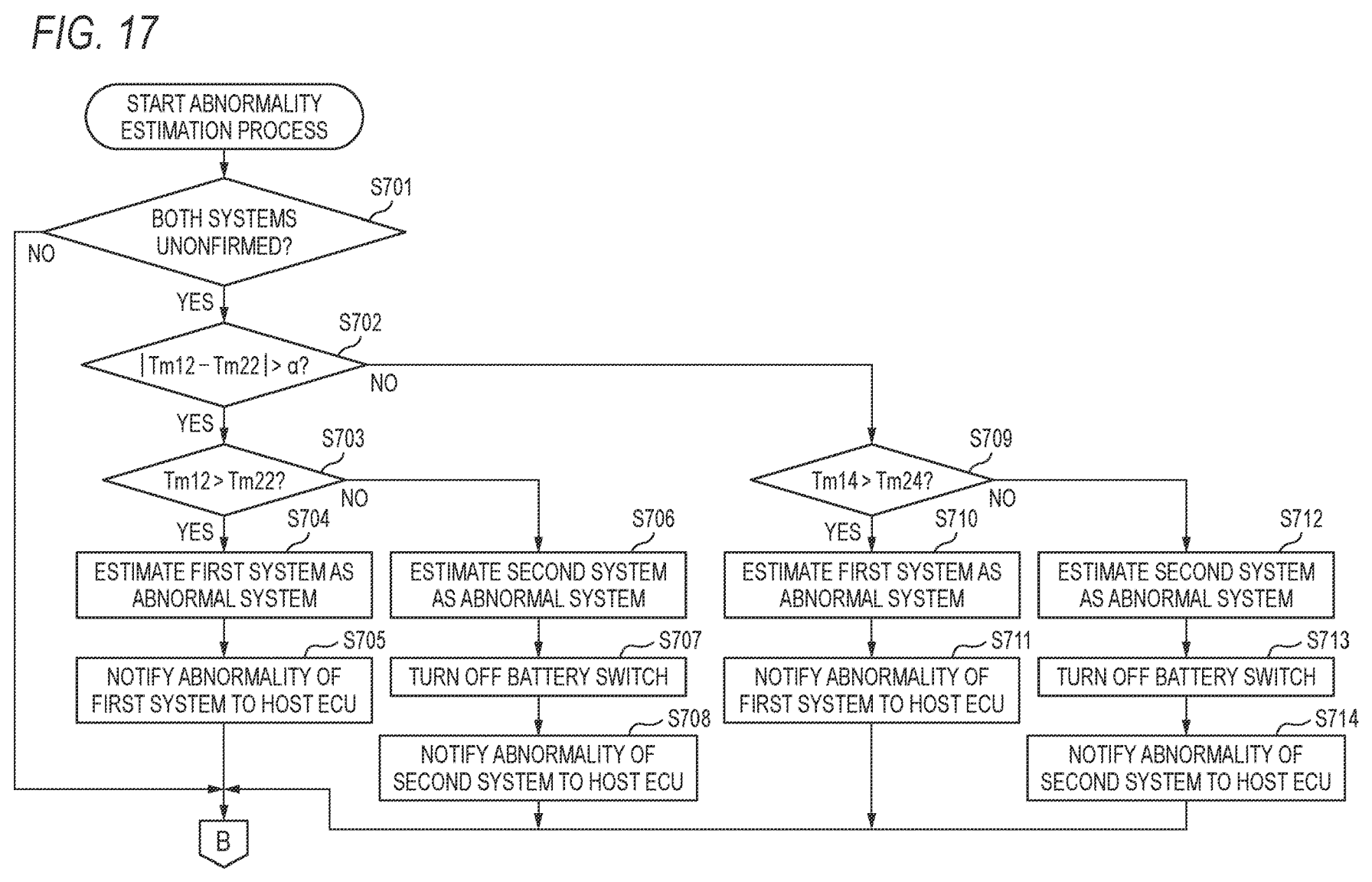

START ABNORMALITY ESTIMATION PROCESS

S701 BOTH SYSTEMS UNCONFIRMED?

NO →

YES

S702 $|Tm12 - Tm22| > \alpha$?

NO →

YES

S703 $Tm12 > Tm22$?

NO →

YES

S704 ESTIMATE FIRST SYSTEM AS ABNORMAL SYSTEM

S705 NOTIFY ABNORMALITY OF FIRST SYSTEM TO HOST ECU

S706 ESTIMATE SECOND SYSTEM AS ABNORMAL SYSTEM

S707 TURN OFF BATTERY SWITCH

S708 NOTIFY ABNORMALITY OF SECOND SYSTEM TO HOST ECU

S709 $Tm14 > Tm24$?

NO →

YES

S710 ESTIMATE FIRST SYSTEM AS ABNORMAL SYSTEM

S711 NOTIFY ABNORMALITY OF FIRST SYSTEM TO HOST ECU

S712 ESTIMATE SECOND SYSTEM AS ABNORMAL SYSTEM

S713 TURN OFF BATTERY SWITCH

S714 NOTIFY ABNORMALITY OF SECOND SYSTEM TO HOST ECU

B

1

POWER SUPPLY CONTROL DEVICE AND POWER SUPPLY CONTROL METHOD

CROSS-REFERENCE TO RELATED APPLICATIONS

This application is based upon and claims the benefit of priority from prior Japanese patent application No. 2022-212567, filed on Dec. 28, 2022, the entire contents of which are incorporated herein by reference.

TECHNICAL FIELD

Embodiments disclosed herein relate to a power supply control device and a power supply control method.

RELATED ART

There has been a redundant power supply system including a first system that supplies electric power from a first power supply to a first load and a second system that supplies electric power from a second power supply to a second load. The redundant power supply system includes a power supply control device including a controller that controls an inter-system switch provided between the first system and the second system.

The power supply control device mounted on a vehicle interrupts the inter-system switch when a power supply failure caused by a decrease in voltage of a first system or a second system is detected. Thereafter, the power supply control device determines an abnormal system in which a power supply failure occurs in the first system and the second system. The power supply control device performs retreat travel using a normal system in which a power supply failure does not occur (for example, please see JP2022-125004A).

The power supply control device determines, as an abnormal system, a system in which a voltage is equal to or smaller than an abnormality determination threshold for a predetermined time. The power supply control device determines, as a normal system, a system recovered until a voltage exceeds the abnormality determination threshold.

SUMMARY

However, the voltages of the first system and the second system may move up and down around the abnormality determination threshold when a half short-circuit occurs instead of a complete ground fault or when a high load state continues intermittently. In the power supply control device, when the voltages of the first system and the second system are moved up and down around the abnormality determination threshold, the abnormal system may not be determined.

An aspect of the embodiment has been made in view of the above, and an object thereof is to provide a power supply control device and a power supply control method capable of estimating an abnormal system when voltages of a first system and a second system move up and down around an abnormality determination threshold.

According to an aspect of the present disclosure, there is provided a power supply control device including: a connection device provided in an inter-system line that connects a first system that supplies electric power from a first power supply to a first load and a second system that supplies electric power from a second power supply to a second load; and a controller configured to control the connection device, in which the controller is configured to control the connection device to cut off the inter-system line in response to a power supply failure of the first system or the second system being detected, execute a confirmation process for confirming a failed system based on a change in a voltage of the first system and a change in a voltage of the second system in a first period, and execute, in a case where the failed system cannot be confirmed in the confirmation process, an estimation process for estimating, as an abnormal system, a system with a greater possibility to be abnormal among the first system and the second system, based on a change in a voltage of the first system and a change in a voltage of the second system in a second period longer than the first period.

A power supply control device and a power supply control method according to an aspect of an embodiment achieve an effect that an abnormal system may be estimated when voltages of a first system and a second system move up and down around an abnormality determination threshold.

BRIEF DESCRIPTION OF DRAWINGS

Exemplary embodiment(s) of the present invention will be described in detail based on the following figures, wherein:

FIG. 5 is a diagram illustrating patterns of states of a first system and a second system according to the embodiment;

FIG. 17 is a flowchart illustrating an example of a process executed by the controller of the power supply control device according to the embodiment;

DESCRIPTION OF EMBODIMENTS

Hereinafter, embodiments of a power supply control device and a power supply control method will be described in detail with reference to the accompanying drawings. The present invention is not limited to the following embodiments. Hereinafter, a power supply control device that is mounted on a vehicle having an autonomous driving function and supplies electric power to a load will be described as an example.

Hereinafter, a case where the vehicle on which the power supply control device is mounted is an electric vehicle or a hybrid vehicle is described, and the vehicle on which the power supply control device is mounted may be an engine automobile that travels by using an internal combustion engine.

1. Configuration of Power Supply Control Device

Figure 1:
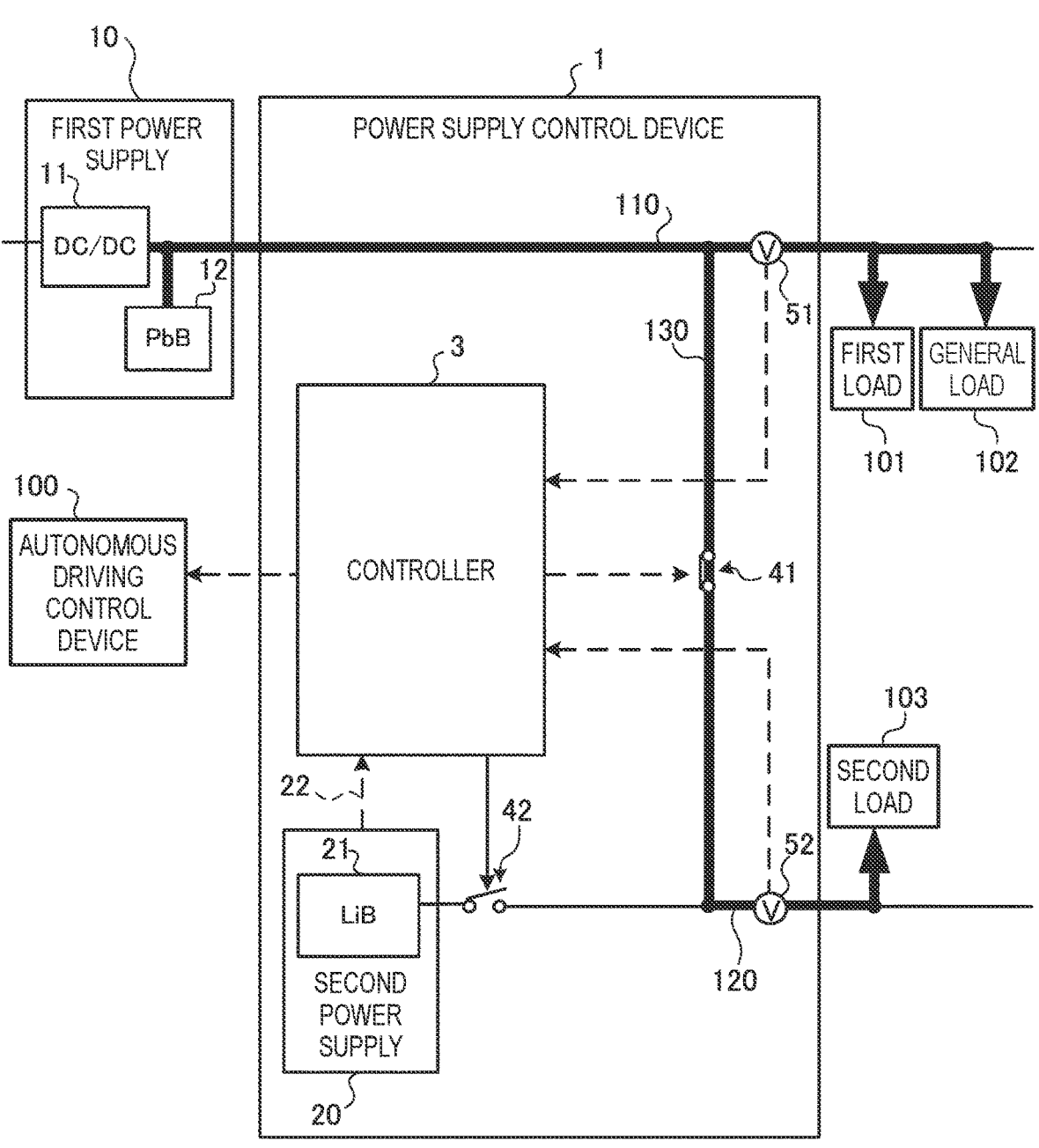
FIG. 1 is a diagram illustrating a configuration and an operation of a power supply control device according to an embodiment.

A configuration and an operation of a power supply control device 1 according to an embodiment will be described with reference to FIGS. 1 to 4. FIGS. 1 to 4 are diagrams illustrating the configuration and the operation of the power supply control device according to the embodiment. As illustrated in FIG. 1, the power supply control device 1 according to the embodiment is connected to a first power supply 10, a first load 101, a general load 102, a second load 103, and an autonomous driving control device 100.

The power supply control device 1 includes a first system 110 and a second system 120. The first system 110 is a power supply system that supplies electric power from the first power supply 10 to the first load 101 and the general load 102. The second system 120 is a power supply system that supplies, to the second load 103, electric power from a second power supply 20 to be described later.

The first load 101 includes a load for autonomous driving. The first load 101 includes a steering motor that operates during autonomous driving, an electric brake device, an in-vehicle camera, and the like. The general load 102 includes a display, an air conditioner, audio, video, and various lights.

The second load 103 has a part of an autonomous driving function of the first load 101. The second load 103 includes a device required at the minimum for fail-safe control (FOP), such as a steering motor, an electric brake device, and a radar. The first load 101, the general load 102, and the second load 103 operate with electric power supplied from the power supply control device 1.

The autonomous driving control device 100 is a device that executes autonomous driving control of the vehicle. The autonomous driving control device 100 causes the vehicle to travel by autonomous driving by operating the first load 101 and the second load 103. When a power supply failure such as a ground fault occurs in the first system 110 during autonomous driving, the autonomous driving control device 100 may execute the FOP using the second load 103. When a power supply failure such as a ground fault occurs in the second system 120, the autonomous driving control device 100 may execute the FOP using the first load 101.

The first power supply 10 includes a DC/DC converter (hereinafter, referred to as "DC/DC 11") and a lead battery (hereinafter, referred to as "PbB 12"). The battery of the first power supply 10 may be any secondary battery other than the PbB 12.

The DC/DC 11 is connected to a generator and a high-voltage battery having a higher voltage than the PbB 12. The DC/DC 11 steps down a voltage of the generator and the high-voltage battery and outputs the stepped-down voltage to the first system 110. The generator is an alternator that converts kinetic energy of a traveling vehicle into electricity and generates electric power. The high-voltage battery is a vehicle driving battery mounted on an electric vehicle or a hybrid vehicle.

When the first power supply 10 is mounted on an engine automobile, the alternator (generator) is provided instead of the DC/DC 11. The DC/DC 11 charges the PbB 12, supplies electric power to the first load 101 and the general load 102, supplies electric power to the second load 103, and charges the second power supply 20 to be described later.

The power supply control device 1 includes the second power supply 20, an inter-system switch 41, a battery switch 42, a controller 3, a first voltage sensor 51, and a second voltage sensor 52. The second power supply 20 is a backup power supply when the first power supply 10 cannot supply the electric power. The second power supply 20 includes a lithium-ion battery (hereinafter, referred to as "LiB 21"). A battery of the second power supply 20 may be any secondary battery other than the LiB 21.

The inter-system switch 41 is provided in an inter-system line 130 that connects the first system 110 and the second system 120. The inter-system switch 41 is a switch capable of connecting and cutting off the first system 110 and the second system 120.

The inter-system switch 41 may be a DC/DC converter. In this case, the DC/DC converter is controlled by the controller 3. The DC/DC converter electrically connects the first system 110 and the second system 120 by starting an operation. The DC/DC converter interrupts the electrical connection between the first system 110 and the second system 120 by stopping the operation.

The inter-system switch 41 is an example of a connection device provided in the inter-system line 130. The battery switch 42 is a switch that connects the second power supply 20 to the second system 120. In the following description, connecting the inter-system switch 41 means electrically connecting, that is, conducting the first system 110 and the second system 120 to each other. Cutting off the inter-system switch 41 means cutting off, that is, interrupting the electrical connection between the first system 110 and the second system 120.

The first voltage sensor 51 is provided in the first system 110. The first voltage sensor 51 detects a voltage of the first system 110. The first voltage sensor 51 outputs a detection result to the controller 3. The second voltage sensor 52 is provided in the second system 120. The second voltage sensor 52 detects a voltage of the second system 120. The second voltage sensor 52 outputs a detection result to the controller 3.

The controller 3 includes a microcomputer including a central processing unit (CPU), a read only memory (ROM), a random access memory (RAM), and the like, and various circuits. The controller 3 may be implemented by hardware such as an application specific integrated circuit (ASIC) or a field programmable gate array (FPGA).

The controller 3 controls an operation of the power supply control device 1 by the CPU executing a program stored in the ROM by using the RAM as a work area. The controller 3 controls the inter-system switch 41 and the battery switch 42.

The controller 3 detects a ground fault in the first system 110 or the second system 120 based on detection results input from the first voltage sensor 51 and the second voltage sensor 52. A specific example of a method of detecting a ground fault by the controller 3 will be described later.

When a ground fault of the first system 110 or the second system 120 is detected, the controller 3 notifies the autonomous driving control device 100 of the detection. When a ground fault of the first system 110 or the second system 120 is detected, the controller 3 outputs, to the autonomous driving control device 100, an autonomous driving prohibition signal indicating that the autonomous driving is not available. When a ground fault of the first system 110 or the second system 120 is not detected, the controller 3 outputs, to the autonomous driving control device 100, an autonomous driving permission signal indicating that the autonomous driving is available.

When a power supply failure such as a ground fault is detected in the first system 110, the controller 3 interrupts the inter-system switch 41 and connects the battery switch 42. Accordingly, the controller supplies, to the second load 103, the electric power from the second power supply 20. When a power supply failure such as a ground fault is detected in the second system 120, the controller 3 interrupts the inter-system switch 41 and interrupts the battery switch 42. Accordingly, the controller 3 supplies, to the first load 101 and the general load 102, the electric power from the first power supply 10.

When a ground fault occurs in one of the first system 110 and the second system 120 during autonomous driving, the power supply control device 1 may use the other normal system. That is, the power supply control device 1 may execute the FOP in which the vehicle is caused to retreat to a safe place by the autonomous driving control device 100 using the other normal system. Accordingly, the autonomous driving control device 100 may stop the vehicle at a safe place.

2. Normal Operation of Power Supply Control Device

As illustrated in FIG. 1, the controller 3 interrupts the battery switch 42 and connects the inter-system switch 41 in a normal state where no ground fault occurs in the first system 110 and the second system 120. Accordingly, the controller 3 supplies the electric power from the first power supply 10 to the first load 101, the general load 102, and the second load 103. In the normal state where no ground fault occurs, the controller 3 outputs the autonomous driving permission signal to the autonomous driving control device 100.

3. Operation of Power Supply Control Device at Time of Ground Fault

Figure 2:
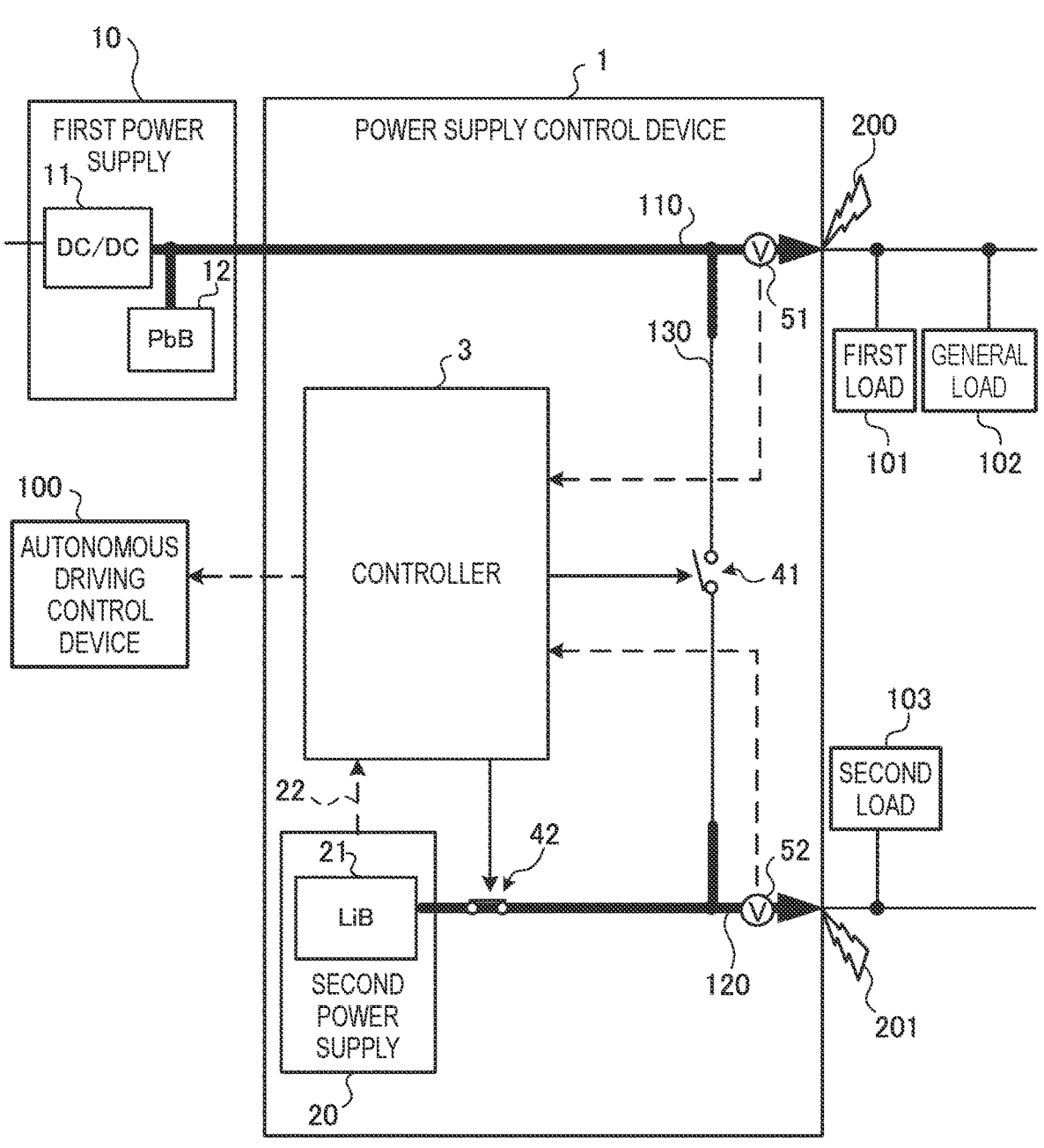
FIG. 2 is a diagram illustrating a configuration and an operation of the power supply control device according to the embodiment.

An operation of the power supply control device 1 at the time of a ground fault will be described. As illustrated in FIG. 2, in the power supply control device 1, when a ground fault 200 occurs in the first system 110, or when a ground fault 201 occurs in the second system 120, an overcurrent flows toward a ground fault point. Therefore, the voltages detected by the first voltage sensor 51 and the second voltage sensor 52 are equal to or smaller than an abnormality determination threshold.

When the voltage detected by the second voltage sensor 52 is equal to or smaller than the abnormality determination threshold, the controller 3 temporarily determines that the ground fault 200 or 201 occurs in the first system 110 or the second system 120.

The controller 3 outputs the autonomous driving prohibition signal to the autonomous driving control device 100 in response to the temporary determination. In response to temporary determination that the ground fault 200 or 201 occurs, the controller 3 interrupts the inter-system switch 41 and connects the battery switch 42.

Hereinafter, the interruption of the inter-system switch 41 based on a result of the temporary determination is also referred to as pre-interruption. Accordingly, the connection between the first system 110 and the second system 120 is cut off. Therefore, the electric power is supplied from the first power supply 10 to the first system 110, and the electric power is supplied from the second power supply 20 to the second system 120.

When the voltage detected by one of the first voltage sensor 51 and the second voltage sensor 52 is equal to or smaller than the abnormality determination threshold, the controller 3 may temporarily determine that a ground fault occurs in the first system 110 or the second system 120.

As described above, in response to temporary determination that a power supply failure occurs in the first system 110 or the second system 120, the controller 3 controls the inter-system switch 41, that is, performs the pre-interruption to cut off the inter-system line 130. After the pre-interruption, the controller 3 executes a confirmation process for confirming the failed system based on a change in the voltage of the first system 110 and a change in the voltage of the second system 120 in a first period.

The voltage of the first system 110 is a voltage detected by the first voltage sensor 51. The voltage of the second system 120 is a voltage detected by the second voltage sensor 52. The first period is, for example, 100 ms, but the first period is not limited to 100 ms. A specific example of the confirmation process will be described later with reference to FIGS. 6 and 7.

In the confirmation process, when the voltage of the first system 110 is equal to or smaller than the abnormality determination threshold for the first period or longer and the voltage of the second system 120 is equal to or larger than the normality determination threshold for the first period or longer, main-determination that the ground fault 200 occurs in the first system 110 is given by the controller 3.

Figure 3:
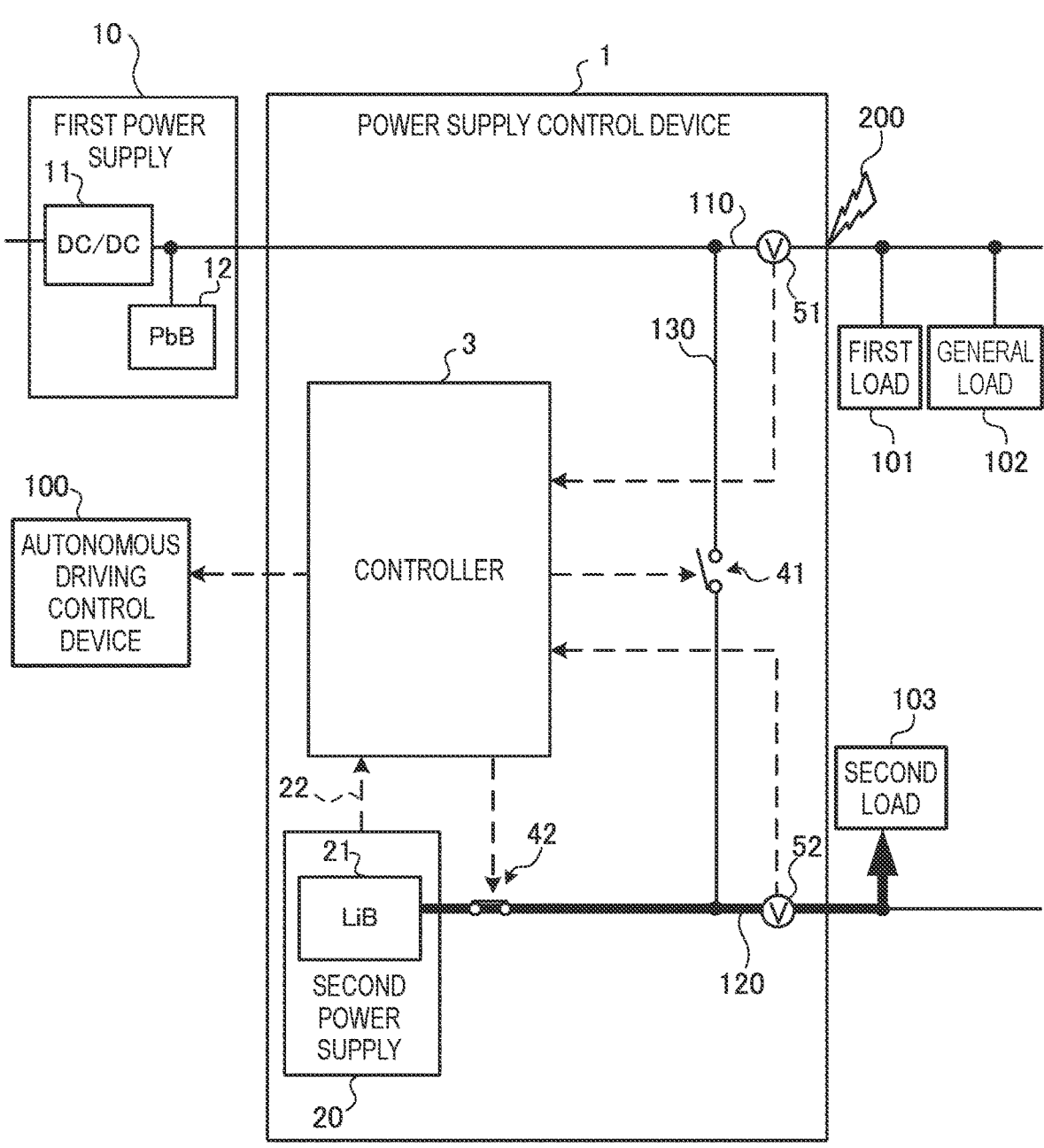
FIG. 3 is a diagram illustrating a configuration and an operation of the power supply control device according to the embodiment.

As illustrated in FIG. 3, in response to the main-determination that the ground fault 200 occurs in the first system 110, the controller 3 supplies the electric power from the second power supply 20 to the second load 103 while maintaining the interruption of the inter-system switch 41 and the connection of the battery switch 42.

The controller 3 notifies the autonomous driving control device 100 of this fact. The autonomous driving control device 100 may operate the second load 103 with the electric power supplied from the second power supply 20 to cause the vehicle to retreat to a safe place and stop. The autonomous driving control device 100 may be configured to start the retreat travel at a time when the autonomous driving prohibition signal is input from the power supply control device 1 due to the temporary determination.

On the other hand, in the confirmation process, when the voltage of the second system 120 is equal to or smaller than the abnormality determination threshold for the first period and the voltage of the first system 110 is equal to or larger than the normality determination threshold for the first period or longer, main-determination that the ground fault 201 occurs in the second system 120 is given by the controller 3.

Figure 4:
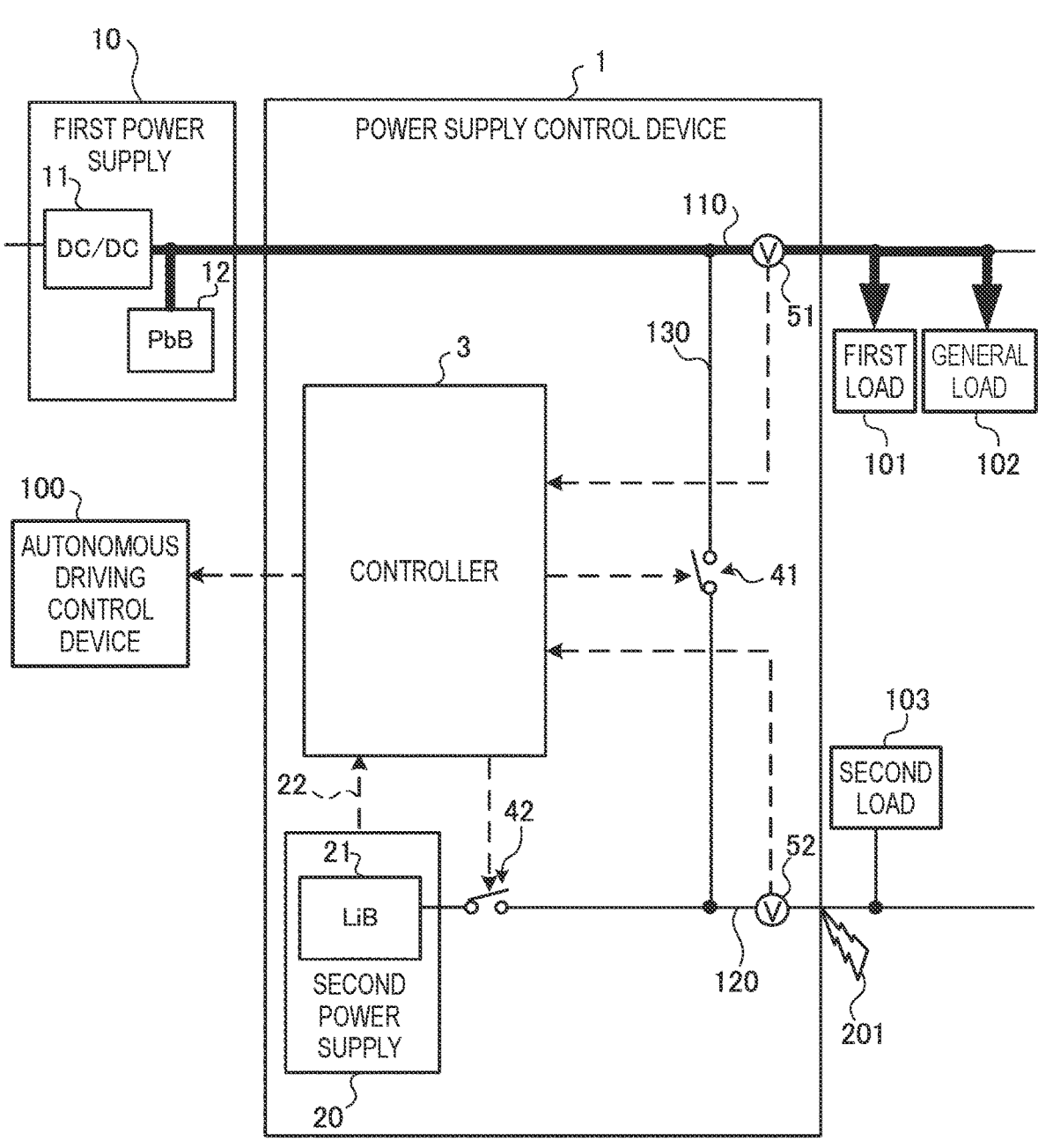
FIG. 4 is a diagram illustrating a configuration and an operation of the power supply control device according to the embodiment.

As illustrated in FIG. 4, in response to determining that the ground fault 201 occurs in the second system 120, the controller 3 interrupts the battery switch 42 while maintaining the interruption of the inter-system switch 41, and supplies the electric power from the first power supply 10 to the first load 101 and the general load 102.

The controller 3 notifies the autonomous driving control device 100 of this fact. The autonomous driving control device 100 operates the first load 101 with the electric power supplied from the first power supply 10, and causes the vehicle to retreat to a safe place and stops the vehicle. The autonomous driving control device 100 may be configured to start the retreat travel at the time when the autonomous driving prohibition signal is input from the power supply control device 1.

The controller 3 is connected to the second power supply 20 and the line 22, and receives and monitors the voltage (the state of charge (SOC) of the LiB 21) of the second power supply 20 via the line 22. When the SOC of the second power supply 20 decreases to a predetermined value or lower, the controller 3 conducts the inter-system switch 41 and the battery switch 42, and charges the second power supply 20 with the electric power from the first power supply 10.

4. Patterns in States of First System and Second System

When it is temporarily determined that a ground fault occurs in the first system 110 or the second system 120 in the power supply control device 1, there is a case where a half short-circuit occurs instead of a complete ground fault, or a case where a high load state continues intermittently.

In the power supply control device 1, in the case where a half short-circuit occurs, or the case where the high load state continues intermittently, the voltage of the first system 110 and the voltage of the second system 120 may move up and down around the abnormality determination threshold.

When the voltage of the first system 110 or the voltage of the second system 120 moves up and down around the abnormality determination threshold, the controller 3 may not confirm in which system a ground fault occurs. That is, when the voltage of the first system 110 or the voltage of the second system 120 return to the voltage greater than the abnormality determination threshold before the first period elapses after the temporary determination that a ground fault occurs, the controller 3 cannot confirm that the system in which the voltage is returned is an abnormal system in which a ground fault occurs.

Referring to FIG. 5, patterns of states of the first system 110 and the second system 120 and the countermeasures executed by the controller 3 in each pattern will be described. FIG. 5 is a diagram illustrating patterns in states of the first system and the second system according to the embodiment.

As illustrated in FIG. 5, there are six patterns including patterns (1) to (6) as the patterns of the states of the first system 110 and the second system 120 after the temporary determination. The pattern (1) is pattern indicating that both the first system 110 and the second system 120 are confirmed to be abnormal systems or normal systems. When both the first system 110 and the second system 120 are confirmed to be normal systems, the controller 3 conducts the inter-system switch 41, interrupts the battery switch 42, and returns to a normal operation illustrated in FIG. 1.

When both the first system 110 and the second system 120 are confirmed to be abnormal systems, the controller 3 interrupts the inter-system switch 41 and the battery switch 42, and notifies the autonomous driving control device 100. Thereafter, the controller 3 stops the operation.

When the first system 110 is confirmed to be the abnormal system and the second system 120 is confirmed to be the normal system, as illustrated in FIG. 3, the controller 3 sets the inter-system switch 41 to an interrupted state and the battery switch 42 to a conductive state. Accordingly, the electric power is supplied from the second power supply 20 to the second load 103 via the second system 120.

When the first system 110 is confirmed to be the normal system and the second system 120 is confirmed to be the abnormal system, as illustrated in FIG. 4, the controller 3 sets the inter-system switch 41 to an interrupted state and the battery switch 42 to an interrupted state. Accordingly, the electric power is supplied from the first power supply 10 to the first load 101 and the general load 102 via the first system 110.

The pattern (2) is a pattern indicating that both the first system 110 and the second system 120 are unconfirmed. That is, the pattern (2) is a pattern indicating both the first system 110 and the second system 120 are not confirmed whether to be abnormal or normal. In the case of the pattern (2), the controller 3 estimates that a ground fault occurs in one system with the greater possibility to have a ground fault, that is, suspected to have a ground fault. The controller 3 estimates the other system to be normal, and uses the other system to perform the retreat travel. For example, when the second system 120 is doubtful, the controller 3 estimates that the second system 120 has a ground fault and the first system 110 is normal. In this case, the controller 3 interrupts the inter-system switch 41 and interrupts the battery switch 42. Accordingly, the controller 3 supplies the electric power from the first power supply 10 to the first load 101 and the general load 102 via the first system 110, thereby causing the retreat travel to be performed.

In the pattern (3), the state of the first system 110 is confirmed to have a ground fault, and the state of the second system 120 is unconfirmed. Since a complete ground fault does not occur in the unconfirmed second system 120, electric power may be supplied therefrom. Therefore, in the case of the pattern (3), the controller 3 regards the unconfirmed second system 120 to be normal, and uses the second system 120 to perform the retreat travel.

The pattern (4) is a pattern in which the state of the first system 110 is unconfirmed and the state of the second system 120 is confirmed to have a ground fault. Since a complete ground fault does not occur in the unconfirmed first system 110, electric power may be supplied therefrom. Therefore, in the case of the pattern (4), the controller 3 regards the unconfirmed first system 110 to be normal, and uses the first system 110 to perform the retreat travel.

The pattern (5) is a pattern in which the state of the first system 110 is confirmed to be normal and the state of the second system 120 is unconfirmed. The first system 110 is confirmed to be normal, and the unconfirmed second system 120 is not stable. Therefore, in the case of the pattern (5), the controller 3 regards the second system 120 as having a ground fault, maintains the interruption of the inter-system switch 41, interrupts the battery switch 42, and uses the first system 110 to perform the retreat travel.

The pattern (6) is a pattern in which the state of the first system 110 is unconfirmed and the state of the second system 120 is confirmed to be normal. The second system 120 is confirmed to be normal, and the state of the unconfirmed first system 110 is not stable. Therefore, in the case of the pattern (6), the controller 3 regards the first system 110 as having a ground fault, and uses the second system 120 to perform the retreat travel.

5. Description of Operation at the Time of Abnormality Confirmation

Figure 6:
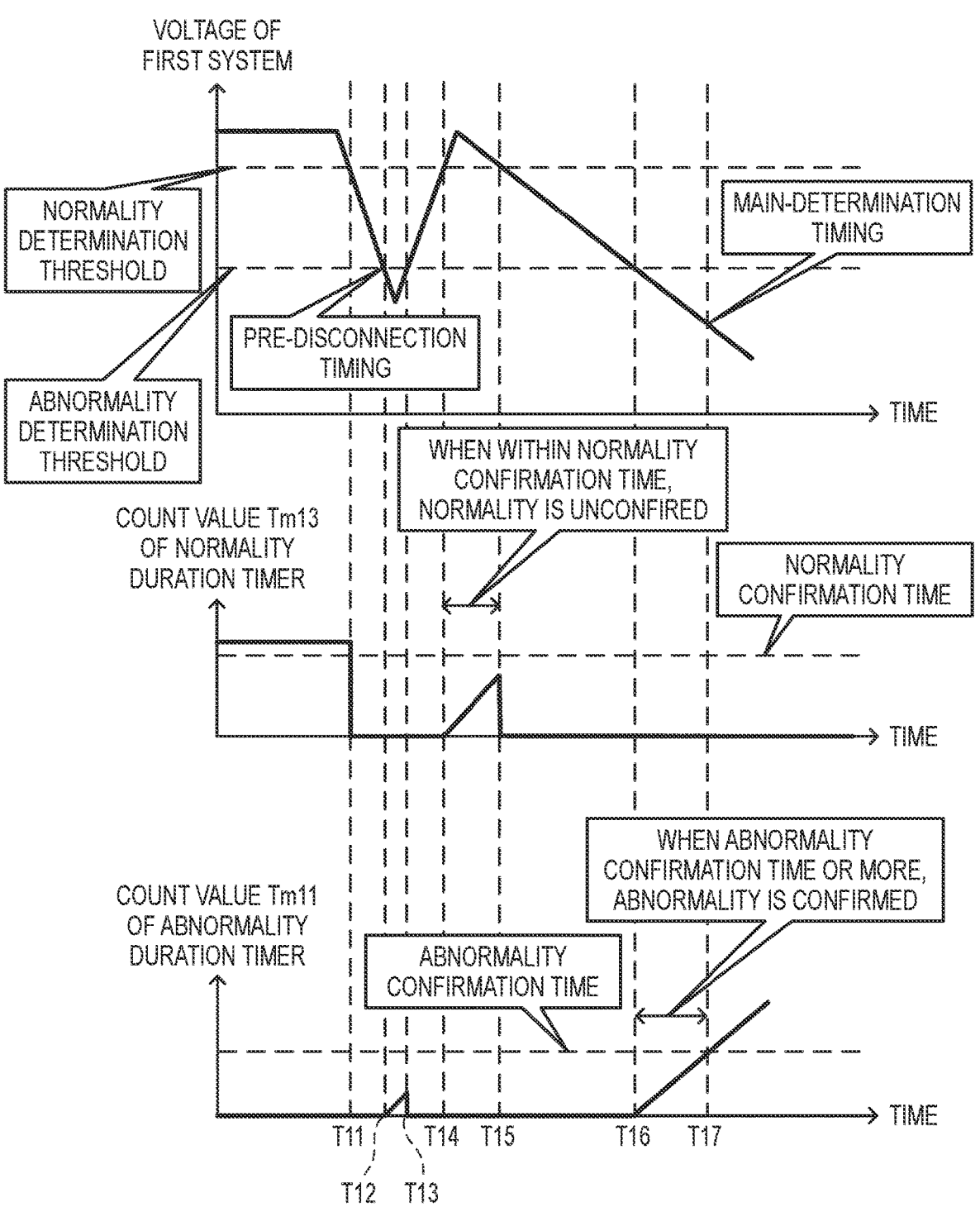
FIG. 6 is a diagram illustrating an abnormality confirmation process according to the embodiment.

An operation of the controller 3 at the time of abnormality confirmation will be described with reference to FIG. 6. FIG. 6 is diagram illustrating an abnormality confirmation process when a ground fault occurs in the first system 110 according to the embodiment.

As illustrated in FIG. 6, the abnormality determination threshold is set to a value lower than the normality determination threshold. The normality determination threshold is set to a value that ensures that a ground fault does not occur in a system having a higher voltage than the value. The abnormality determination threshold is set to a value that ensures that a ground fault occurs in a system having a voltage lower than the value.

In the example illustrated in FIG. 6, the voltage of the first system 110 varies from the normality determination threshold or more to the normality determination threshold or less at a time t11, and varies from the abnormality determination threshold or more to the abnormality determination threshold or less at a time t12. Thereafter, the voltage of the first system 110 varies from the abnormality determination threshold or less to the abnormality determination threshold or more at a time t13, and varies from the normality determination threshold or less to the normality determination threshold or more at a time t14. Furthermore, the voltage of the first system 110 varies from the normality determination threshold or more to the normality determination threshold or less at a time t15, and varies from the abnormality determination threshold or more to the abnormality determination threshold or less at a time t16. In this case, the controller 3 pre-interrupts the inter-system switch 41 at the time t12 when the voltage of the first system 110 varies from the abnormality determination threshold or more to the abnormality determination threshold or less in the first place, and starts the main-determination.

The controller 3 includes a normality duration timer of the first system 110 and an abnormality duration timer of the first system 110. The normality duration timer of the first system 110 is a timer that measures duration in which the voltage of the first system 110 is equal to or larger than the normality determination threshold. In the example illustrated in FIG. 6, a count value Tm13 of the normality duration timer of the first system 110 is temporarily reset at the time t11 when the voltage of the first system 110 is equal to or smaller than the normality determination threshold in the first place. The count value Tm13 thereafter increases from the time t14 when the voltage of the first system 110 is equal to or larger than the normality determination threshold, but is reset at the time t15 when the voltage of the first system 110 is from the normality determination threshold or more to the normality determination threshold or less.

When the count value Tm13 of the normality duration timer of the first system 110 is less than normality confirmation time, which is the first period from the time t14 when the voltage is equal to or larger than the normality determination threshold to the time T15, the controller 3 sets the state of the first system 110 as being unconfirmed to be normal. The normality confirmation time is 100 ms, but is not limited to 100 ms.

The abnormality duration timer of the first system 110 is a timer that measures duration in which the voltage of the first system 110 is equal to or smaller than the abnormality determination threshold. In the example illustrated in FIG. 6, a count value Tm11 of the abnormality duration timer of the first system 110 increases from the time t12 when the voltage of the first system 110 is equal to or smaller than the abnormality determination threshold, and is reset at the time t13 when the voltage of the first system 110 is equal to or larger than the abnormality determination threshold.

Thereafter, the count value Tm1 continues to increase from the time t16 when the voltage is equal to or smaller than the abnormality determination threshold again. When the count value Tm11 of the abnormality duration timer of the first system 110 is equal to or larger than the abnormality confirmation time, which is the first period, the controller 3 confirms the state of the first system 110 to be abnormal. The abnormality confirmation time is 100 ms, but is not limited to 100 ms. The controller 3 sets, as the timing of the main-determination, a time t17 when the abnormality is confirmed.

As described above, when a ground fault occurs in the first system 110, the normality duration does not exceed the normality confirmation time, which is the first period, and the normality is unconfirmed. On the other hand, when a ground fault occurs in the first system 110, since the abnormality duration exceeds the abnormality confirmation time, which is the first period, the first system 110 is confirmed to be abnormal. The controller 3 gives priority to a confirmed state rather than an unconfirmed state. Accordingly, the main-determination that the first system 110 is abnormal, that is, a ground fault occurs is given by the controller 3.

Although a first period for normality confirmation and a first period for abnormality confirmation are explained to be the same, the periods are not necessarily the same and may be different. For example, the first period for normality confirmation may be 100 ms, and the first period for abnormality confirmation may be 80 ms.

6. Description of Operation at the Time of Abnormality Confirmation

Figure 7:
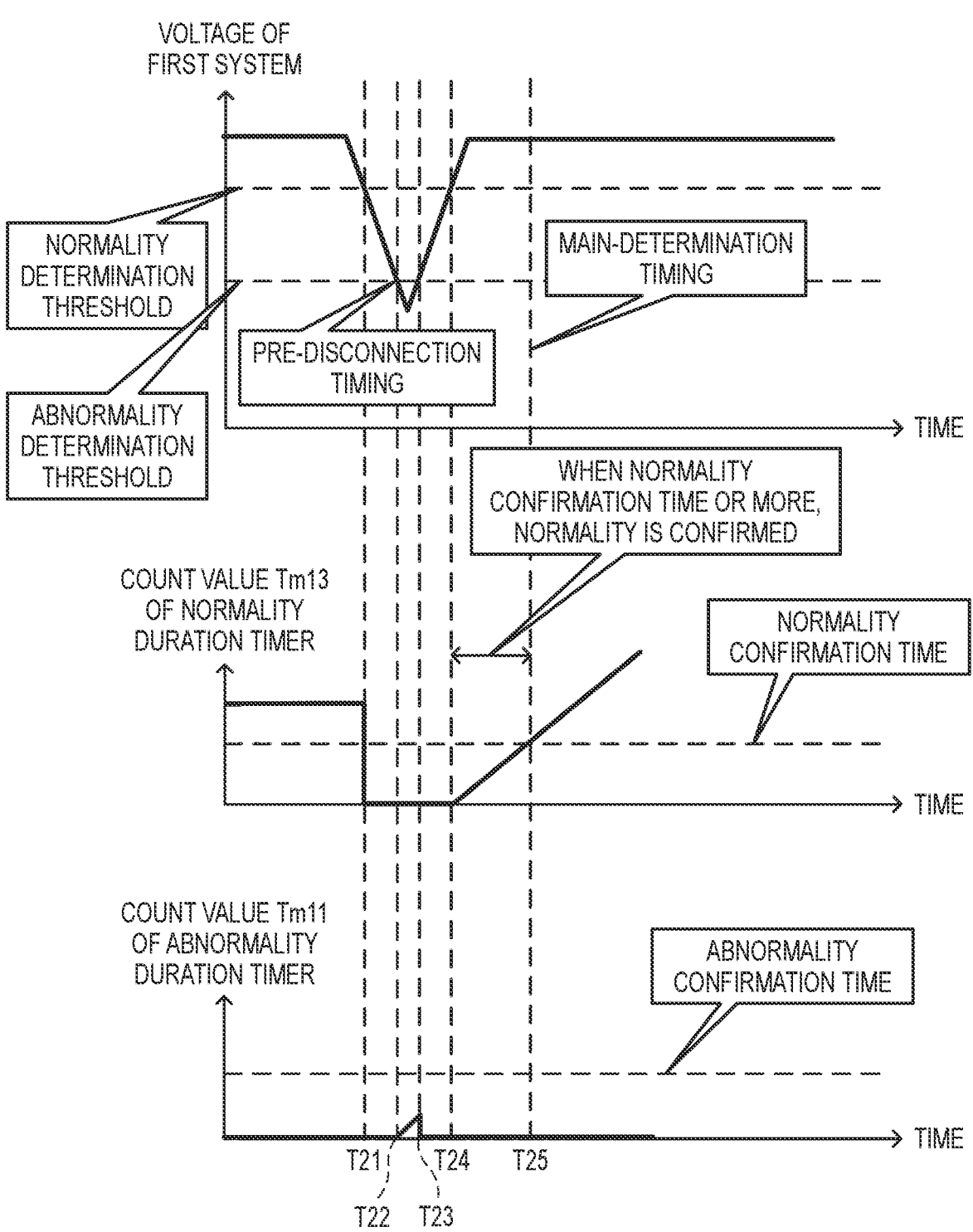
FIG. 7 is a diagram illustrating a normal confirmation process according to the embodiment.

An operation of the controller 3 at the time of normality confirmation will be described with reference to FIG. 7. FIG. 7 is diagram illustrating a normality confirmation process when no ground fault occurs in the first system 110 according to the embodiment.

In the example illustrated in FIG. 7, the voltage of the first system 110 varies from the normality determination threshold or more to the normality determination threshold or less at a time t21, and varies from the abnormality determination threshold or more to the abnormality determination threshold or less at a time t22. Thereafter, the voltage of the first system 110 varies from the abnormality determination threshold or less to the abnormality determination threshold or more at a time t23, and varies from the normality determination threshold or less to the normality determination threshold or more at a time t24. In this case, the controller 3 pre-interrupts the inter-system switch 41 at the time t22 when the voltage of the first system 110 varies from the abnormality determination threshold or more to the abnormality determination threshold or less in the first place, and starts the main-determination.

In the example illustrated in FIG. 7, the count value Tm13 of the normality duration timer of the first system 110 is temporarily reset at the time t21 when the voltage of the first system 110 is equal to or smaller than the normality determination threshold in the first place. Thereafter, the count value Tm13 continues to increase from the time t24 when the voltage of the first system 110 is equal to or larger than the normality determination threshold. When the count value Tm13 of the normality duration timer of the first system 110 is equal to or larger than the normality confirmation time, the controller 3 sets the state of the first system 110 to be normality confirmed. The controller 3 sets, as the timing of the main-determination, a time t25 when the normality is confirmed.

In the example illustrated in FIG. 7, the count value Tm11 of the abnormality duration timer of the first system 110 increases from the time t22 when the voltage of the first system 110 equal to or smaller than the abnormality determination threshold to the time t23. The count value Tm11 of the abnormality duration timer of the first system 110 is reset at the time T23 when the voltage of the first system 110 varies from the abnormality determination threshold or less to the abnormality determination threshold or more, and thereafter the reset state continues. When the time from the time t22 when the voltage of the first system 110 is equal to or smaller than the abnormality determination threshold to the time t23 is less than the abnormality confirmation time, the controller 3 sets the state of the first system 110 to be abnormality unconfirmed.

In this way, when the first system 110 is normal, the abnormality duration does not exceed the abnormality confirmation time, which is the first period, and the abnormality is unconfirmed. On the other hand, when the first system 110 is normal, since the normal duration exceeds the normality confirmation time, which is the first period, the normality is confirmed. The controller 3 gives priority to a confirmed state rather than an unconfirmed state. Accordingly, the controller 3 confirms that the first system 110 is normal.

The controller 3 further includes a normality duration timer of the second system 120 and an abnormality duration timer of the second system 120. The normality duration timer of the second system 120 is a timer that measures duration in which the voltage of the second system 120 is equal to or larger than the normality determination threshold. The abnormality duration timer of the second system 120 is a timer that measures duration in which the voltage of the second system 120 is equal to or smaller than the abnormality determination threshold. Based on a count value Tm23 of the normality duration timer of the second system 120 and a count value Tm21 of the abnormality duration timer of the second system 120, the controller 3 confirms the normality and abnormality of the second system 120 by the same method as that in the first system 110.

Figure 8:
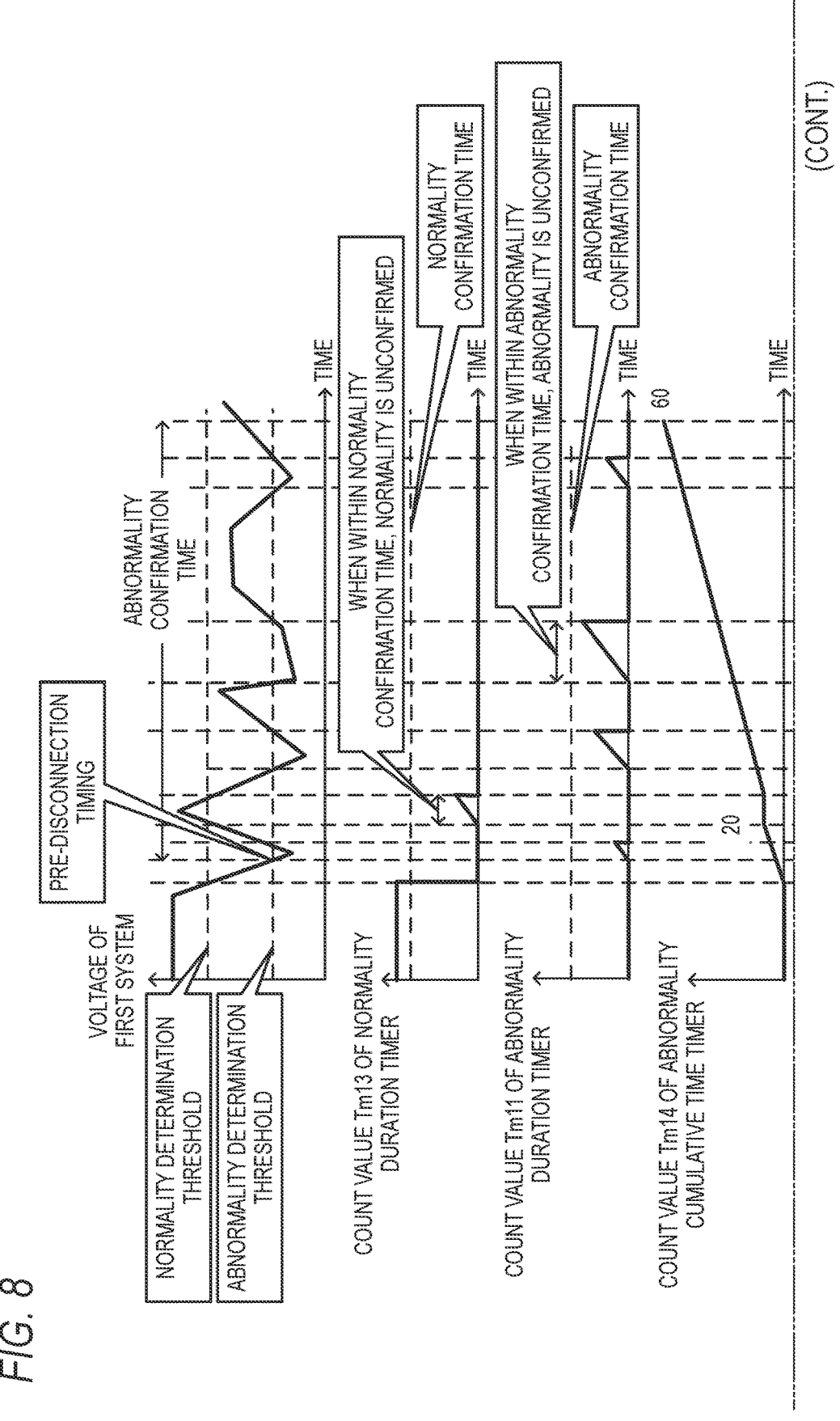
FIG. 8 is a diagram illustrating an estimation process of the first system according to the embodiment.
Figure 9:
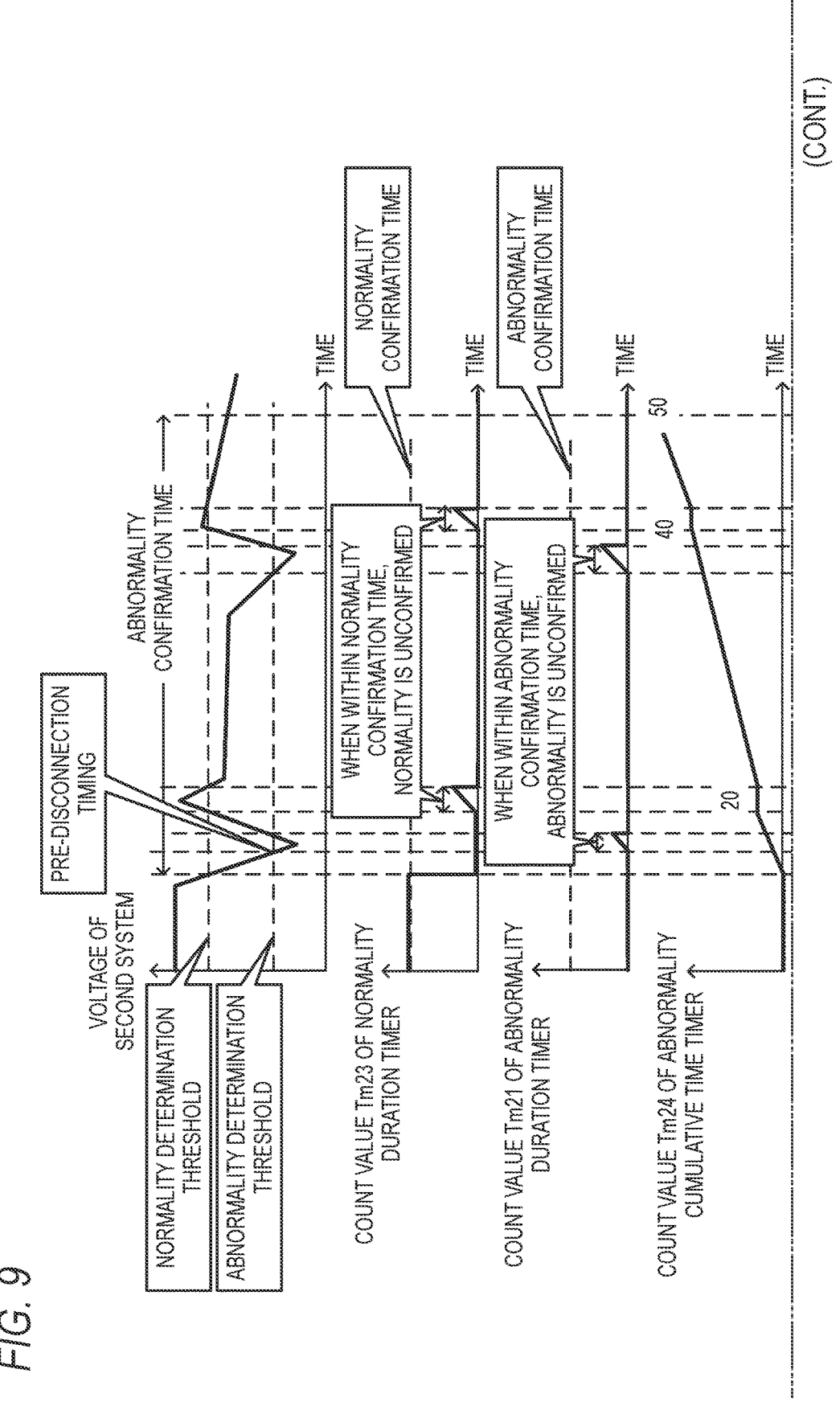
FIG. 9 is a diagram illustrating an estimation process of the second system according to the embodiment.

7. Description of Operation at the Time of Normality And Abnormality Unconfirmed An operation of the controller 3 at the time when normality and abnormality are unconfirmed will be described with reference to FIGS. 8 and 9. FIG. 8 is a diagram illustrating an estimation process of the first system according to the embodiment. FIG. 9 is a diagram illustrating an estimation process of the second system according to the embodiment.

When the failed system cannot be confirmed by the confirmation process, the controller 3 executes an estimation process. Specifically, based on the voltage of the first system 110 and the voltage of the second system 120 in a second period longer than the first period, the controller 3 executes an estimation process for estimating, as the abnormal system, a system strongly suspected to be abnormal.

The second period is 1 s (1000 ms), but is not limited to 1 s. The abnormality determination time illustrated in FIGS. 8 and 9 is an example of the second period. When the voltages of the first system 110 and the second system 120 move up and down around the abnormality determination threshold, the controller 3 may estimate the abnormal system by the estimation process.

The controller 3 includes an abnormality cumulative time timer of the first system 110, an abnormality cumulative number counter of the first system 110, an abnormality cumulative time timer of the second system 120, and an abnormality cumulative number counter of the second system 120.

The abnormality cumulative time timer of the first system 110 is a timer that measures a cumulative time when the voltage of the first system 110 is equal to or smaller than the normality determination threshold and a cumulative time when the voltage of the first system 110 is equal to or smaller than the abnormality determination threshold. Here, a count value of the cumulative time when the voltage of the first system 110 is equal to or smaller than the normality determination threshold is set as Tm14. A count value of the cumulative time when the voltage of the first system 110 is equal to or smaller than the abnormality determination threshold is set as Tm12. The count values Tm12 and Tm14 are not reset during the abnormality determination time, which is the second period from a time t32 when the main-determination is started to a time t42.

The abnormality cumulative number counter of the first system 110 is a counter that measures the cumulative number of times the voltage of the first system 110 varies from the normality determination threshold or more to the normality determination threshold or less and the cumulative number of times the voltage of the first system 110 varies from the abnormality determination threshold or more to the abnormality determination threshold or less. Here, a count value of the cumulative number of times the voltage of the first system 110 is equal to or smaller than the normality determination threshold is set as Ct12. A count value of the cumulative number of times the voltage of the first system 110 is equal to or smaller than the abnormality determination threshold is set as Ct11. The count values Ct11 and Ct12 are not reset during the abnormality determination time, which is the second period from the time t32 when the main-determination is started to the time t42.

The abnormality cumulative time timer of the second system 120 is a timer that measures a cumulative time when the voltage of the second system 120 is equal to or smaller than the normality determination threshold and a cumulative time when the voltage of the second system 120 is equal to or smaller than the abnormality determination threshold. Here, a count value of the cumulative time when the voltage of the first system 110 is equal to or smaller than the normality determination threshold is set as Tm24. A count value of the cumulative time when the voltage of the first system 110 is equal to or smaller than the abnormality determination threshold is set as Tm22. The count values Tm22 and Tm24 are not reset during the abnormality determination time, which is the second period from a time t52 when the main-determination is started to a time t60.

The abnormality cumulative number counter of the first system 110 is a counter that measures the cumulative number of times the voltage of the first system 110 varies from the abnormality determination threshold or more to the normality determination threshold or less and the cumulative number of times the voltage of the first system 110 varies from the abnormality determination threshold or more to the abnormality determination threshold or less. Here, a count value of the cumulative number of times the voltage of the second system 120 is equal to or smaller than the normality determination threshold is set as Ct22. A count value of the cumulative number of times the voltage of the first system 110 is equal to or smaller than the abnormality determination threshold is set as Ct21. The count values Ct21 and Ct22 are not reset during the abnormality determination time, which is the second period from the time t52 when the main-determination is started to the time t60.

7-1. Estimation Process of First System

In the example illustrated in FIG. 8, the voltage of the first system 110 varies from the normality determination threshold or more to the normality determination threshold or less at a time t31, and varies from the abnormality determination threshold or more to the abnormality determination threshold or less at a time t32. Thereafter, the voltage of the first system 110 varies from the abnormality determination threshold or less to the abnormality determination threshold or more at a time t33, and varies from the normality determination threshold or less to the normality determination threshold or more at a time t34. Furthermore, the voltage of the first system 110 varies from the normality determination threshold or more to the normality determination threshold or less at a time t35, and varies from the abnormality determination threshold or more to the abnormality determination threshold or less at a time t36.

Thereafter, the voltage of the first system 110 varies from the abnormality determination threshold or less to the abnormality determination threshold or more at a time t37, and varies from the abnormality determination threshold or more to the abnormality determination threshold or less at a time t38. Thereafter, the voltage of the first system 110 varies from the abnormality determination threshold or less to the abnormality determination threshold or more at a time t39, and varies from the abnormality determination threshold or more to the abnormality determination threshold or less at a time t40. Thereafter, the voltage of the first system 110 varies from the abnormality determination threshold or less to the abnormality determination threshold or more at a time t41. The controller 3 pre-interrupts the inter-system switch 41 at the time t32 when the voltage of the first system 110 is from the abnormality determination threshold or more to the abnormality determination threshold or less in the first place, and starts the main-determination.

In the example illustrated in FIG. 8, the voltage of the first system 110 is equal to or larger than the normality determination threshold from the time t34 to the time t35. However, since the count value Tm13 of the normality duration timer of the first system 110 is within the normality confirmation time, the normality of the first system 110 is unconfirmed at the time t42 when the abnormality determination time has elapsed.

Within the abnormality determination time, the duration in which the voltage of the first system 110 is equal to or smaller than the abnormality determination threshold is the longest from the time t38 to the time t39. However, since the count value Tm11 of the abnormality duration timer of the first system 110 is within the abnormality confirmation time, the abnormality of the first system 110 is unconfirmed by the controller 3 at the time t42 when the abnormality determination time has elapsed.

When both normality and abnormality of the first system 110 are not confirmed at the time t42 when the abnormality determination time has elapsed, the controller 3 refers to the count values Tm14 and Tm12 of the abnormality cumulative time timer of the first system 110 and the count values Ct12 and Ct11 of the abnormality cumulative number counter of the first system 110.

When the normality and abnormality of the first system 110 are not confirmed, the controller 3 refers to the count values Tm24 and Tm22 of the abnormality cumulative time timer of the second system 120 and the count values Ct22 and Ct21 of the abnormality cumulative number counter of the second system 120. The controller 3 estimates the normality and abnormality of the first system 110 based on the count values Tm14, Tm12, Tm24, Tm22, Ct12, Ct11, Ct22, and Ct21.

In the example illustrated in FIG. 8, the count value Tm14 of the abnormality cumulative time timer of the first system 110 at an end time point t42 of the abnormality determination time is 60. The count value Tm12 of the abnormality cumulative time timer of the first system 110 at the end time point of the abnormality determination time is 50. The count value Ct12 of the abnormality cumulative number counter of the first system 110 at the end time point of the abnormality determination time is 2. The count value Ct11 of the abnormality cumulative number counter of the first system 110 at the end time point of the abnormality determination time is 4.

7-2. Estimation Process of Second System

In the example illustrated in FIG. 9, the voltage of the second system 120 varies from the normality determination threshold or more to the normality determination threshold or less at a time t51, and varies from the abnormality determination threshold or more to the abnormality determination threshold or less at a time t52. Thereafter, the voltage of the second system 120 varies from the abnormality determination threshold or less to the abnormality determination threshold or more at a time t53, and varies from the normality determination threshold or less to the normality determination threshold or more at a time t54. Furthermore, the voltage of the second system 120 varies from the normality determination threshold or more to the normality determination threshold or less at a time t55, and varies from the abnormality determination threshold or more to the abnormality determination threshold or less at a time t56.

Thereafter, the voltage of the second system 120 varies from the abnormality determination threshold or less to the abnormality determination threshold or more at a time t57, and varies from the normality determination threshold or less to the normality determination threshold or more at a time t58. Thereafter, the voltage of the second system 120 varies from the normality determination threshold or more to the normality determination threshold or less at a time t59. The controller 3 pre-interrupts the inter-system switch 41 at the time t52 when the voltage of the second system 120 is from the abnormality determination threshold or more to the abnormality determination threshold or less in the first place, and starts the main-determination.

In the example illustrated in FIG. 9, the voltage of the second system 120 is equal to or larger than the normality determination threshold between the time t54 and the time t55 and between the time t58 and the time t59. However, since the count value Tm23 of the normality duration timer of the second system 120 is within the normality confirmation time, the normality of the second system 120 is unconfirmed by the controller 3 at the time t60 when the abnormality determination time has elapsed.

The voltage of the second system 120 is the abnormality determination threshold or less between the time t52 and the time t53 and between the time t56 and the time t57. However, since the count value Tm21 of the abnormality duration timer of the second system 120 is within the abnormality confirmation time, the abnormality of the second system 120 is unconfirmed by the controller 3 at the time t60 when the abnormality determination time has elapsed.

When both normality and abnormality of the second system 120 are not confirmed at the time t60 when the abnormality determination time has elapsed, the controller 3 refers to the count values Tm24 and Tm22 of the abnormality cumulative time timer of the second system 120 and the count values Ct22 and Ct21 of the abnormality cumulative number counter of the second system 120.

When the normality and abnormality of the second system 120 are not confirmed, the controller 3 refers to the count values Tm14 and Tm12 of the abnormality cumulative time timer of the first system 110 and the count values Ct12 and Ct11 of the abnormality cumulative number counter of the first system 110. The controller 3 estimates the normality and abnormality of the second system 120 based on the count values Tm14, Tm12, Tm24, Tm22, Ct12, Ct11, Ct22, and Ct21.

In the example illustrated in FIG. 9, the count value Tm24 of the abnormality cumulative time timer of the second system 120 at an end time point t60 of the abnormality determination time is 50. The count value Tm22 of the abnormality cumulative time timer of the first system 110 at the end time point of the abnormality determination time is 20. The count value Ct22 of the abnormality cumulative number counter of the first system 110 at the end time point of the abnormality determination time is 3. The count value Ct21 of the abnormality cumulative number counter of the first system 110 at the end time point of the abnormality determination time is 2.

A system having a long time when the voltage is the abnormality determination threshold or less is strongly suspected to be abnormal. Therefore, when the controller 3 does not confirm whether both the first system 110 and the second system 120 are normal or abnormal at a time point when the abnormality determination time has elapsed, that is, when the normality and the abnormality of both systems are unconfirmed, as a first estimation method, the controller 3 estimates the abnormal system based on a cumulative time when the voltage is equal to or smaller than the abnormality determination threshold. Specifically, the controller 3 estimates, as the abnormal system, the system having the longer cumulative time among a cumulative time when the voltage of the first system 110 is equal to or smaller than the abnormality determination threshold and a cumulative time when the voltage of the second system 120 is equal to or smaller than the abnormality determination threshold.

When the voltage of the first system 110 is in a state illustrated in FIG. 8 and the voltage of the second system 120 is in a state illustrated in FIG. 9, the count value Tm12 of the abnormality cumulative time timer of the first system 110 is 50. On the other hand, the count value Tm22 of the abnormality cumulative time timer of the second system 120 is 20. In this case, the controller 3 estimates the first system 110 as the abnormal system. Accordingly, even when it is not confirmed whether both the first system 110 and the second system 120 are normal or abnormal, the abnormal system may be estimated.

A system in which the time when the voltage is the normality determination threshold or less is a long is strongly suspected to be abnormal. Therefore, when the controller 3 does not confirm whether both the first system 110 and the second system 120 are normal or abnormal at the time point when the abnormality determination time has elapsed, the controller 3 estimates, using a second estimation method, the abnormal system based on a time when the voltage is equal to or smaller than the normality determination threshold. Specifically, the controller 3 estimates, as the abnormal system, the system having the longer cumulative time among a cumulative time when the voltage of the first system 110 is equal to or smaller than the normality determination threshold and a cumulative time when the voltage of the second system 120 is equal to or smaller than the normality determination threshold.

When the voltage of the first system 110 is in a state illustrated in FIG. 8 and the voltage of the second system 120 is in a state illustrated in FIG. 9, the count value Tm12 of the abnormality cumulative time timer of the first system 110 is 60. On the other hand, the count value Tm24 of the abnormality cumulative time timer of the second system 120 is 50. In this case, the controller 3 estimates the first system 110 as the abnormal system. Accordingly, even when it is not confirmed whether both the first system 110 and the second system 120 are normal or abnormal, the abnormal system may be estimated.

When the cumulative time when the voltage of the first system 110 is equal to or smaller than the abnormality determination threshold and the cumulative time when the voltage of the second system 120 is equal to or smaller than the abnormality determination threshold are the same, or a difference in the time is within an error range, the controller 3 may not estimate the abnormal system by the estimation process.

In this case, the controller 3 estimates, as the abnormal system, the system having the longer cumulative time among the cumulative time when the voltage of the first system 110 is equal to or smaller than the normality determination threshold and the cumulative time when the voltage of the second system 120 is equal to or smaller than the normality determination threshold. That is, the controller 3 estimates the abnormal system by giving a first priority to the first estimation method. When the abnormal system cannot be estimated by the first estimation method, the controller 3 estimates the abnormal system using the second estimation method.

Accordingly, even when the cumulative time when the voltage of the first system 110 is equal to or smaller than the abnormality determination threshold and the cumulative time when the voltage of the second system 120 is equal to or smaller than the abnormality determination threshold are the same, or their difference is within an error range, the controller 3 may estimate the abnormal system.

A system in which the number of times the voltage is equal to or smaller than the abnormality determination threshold is strongly suspected to be abnormal. Therefore, when the controller 3 does not confirm whether both the first system 110 and the second system 120 are normal or abnormal at the time point when the abnormality determination time has elapsed, the controller 3 estimates, using a third estimation method, the abnormal system based on the number of times the voltage is equal to or smaller than the abnormality determination threshold. Specifically, the controller 3 estimates, as the abnormal system, the system having the larger number of times among the number of times the voltage of the first system 110 is equal to or smaller than the abnormality determination threshold and the number of times the voltage of the second system 120 is equal to or smaller than the abnormality determination threshold.

When the voltage of the first system 110 is in a state illustrated in FIG. 8 and the voltage of the second system 120 is in a state illustrated in FIG. 9, the count value Ct11 of the abnormality cumulative number counter of the first system 110 is 4. The count value Ct21 of the abnormality cumulative number counter of the second system 120 is 2. In this case, the controller 3 estimates the first system 110 as the abnormal system. Accordingly, even when it is not confirmed whether both the first system 110 and the second system 120 are normal or abnormal, the abnormal system may be estimated.

A system in which the number of times the voltage is equal to or smaller than the normality determination threshold is small, in other words, a system in which the number of times the voltage is in a normal range is small, is strongly suspected to be abnormal. Therefore, when the controller 3 does not confirm whether both the first system 110 and the second system 120 are normal or abnormal at the time point when the abnormality determination time has elapsed, the controller 3 estimates, using a fourth estimation method, the abnormal system based on the number of times the voltage is equal to or smaller than the normality determination threshold. Specifically, the controller 3 estimates, as the abnormal system, the system having the smaller number of times among the number of times the voltage of the first system 110 is equal to or smaller than the normality determination threshold and the number of times the voltage of the second system 120 is equal to or smaller than the normality determination threshold.

When the voltage of the first system 110 is in a state illustrated in FIG. 8 and the voltage of the second system 120 is in a state illustrated in FIG. 9, the count value Ct12 of the abnormality cumulative number counter of the first system 110 is 2. The count value Ct22 of the abnormality cumulative number counter of the second system 120 is 3. In this case, the controller 3 estimates the first system 110 as the abnormal system. Accordingly, even when it is not confirmed whether both the first system 110 and the second system 120 are normal or abnormal, the abnormal system may be estimated.

The controller 3 may be configured to estimate, as the abnormal system, the system having the larger number of times among the number of times the voltage of the first system 110 is from the normality determination threshold or less to the normality determination threshold or more and the number of times the voltage of the second system 120 is from the normality determination threshold or less to the normality determination threshold or more.

When the number of times the voltage of the first system 110 is equal to or smaller than the abnormality determination threshold and the number of times the voltage of the second system 120 is equal to or smaller than the abnormality determination threshold are the same, or their difference is within an error range, the controller 3 may not estimate the abnormal system by the estimation process.

In this case, the controller 3 estimates, as the abnormal system, the system having the smaller cumulative number of times among the number of times the voltage of the first system 110 is equal to or smaller than the normality determination threshold and the number of times the voltage of the second system 120 is equal to or smaller than the normality determination threshold. That is, the controller 3 estimates the abnormal system by giving a first priority to the third estimation method. When the abnormal system cannot be estimated by the third estimation method, the controller 3 estimates the abnormal system using the fourth estimation method.

Accordingly, when the number of times the voltage of the first system 110 is equal to or smaller than the abnormality determination threshold and the number of times the voltage of the second system 120 is equal to or smaller than the abnormality determination threshold are the same, or their difference is within an error range, the controller 3 may estimate the abnormal system.

The controller 3 may be configured to re-examine the abnormal system when a system strongly suspected to be abnormal is estimated as the abnormal system. That is, as a result of the above-mentioned estimation process, the controller 3 executes the above-mentioned confirmation process and estimation process again on the system strongly suspected to be abnormal. Accordingly, the controller 3 may more reliably estimate the abnormal system.

In the above embodiment, the controller 3 estimates the abnormal system by one or a combination of the first to fourth estimation methods. Alternatively, the controller 3 may estimate the abnormal system by using all of the first to fourth estimation methods. Specifically, the controller 3 estimates the abnormal system by each of the first to fourth estimation methods, and estimates a system estimated to be most abnormal as the abnormal system. For example, it is assumed that the controller 3 estimates that the first system is abnormal by the first to third estimation methods, and estimates that the second system is abnormal by the fourth estimation method. In this case, the controller 3 estimates that the first system is abnormal as the result of three to one.

8. Process Executed by Controller

Next, a process executed by the controller 3 of the power supply control device 1 according to the embodiment will be described with reference to FIGS. 10 to 19. FIGS. 10 to 19 are flowcharts illustrating an example of the process executed by the controller of the power supply control device according to the embodiment.

8-1. Abnormal System Determination Process

Figure 10:
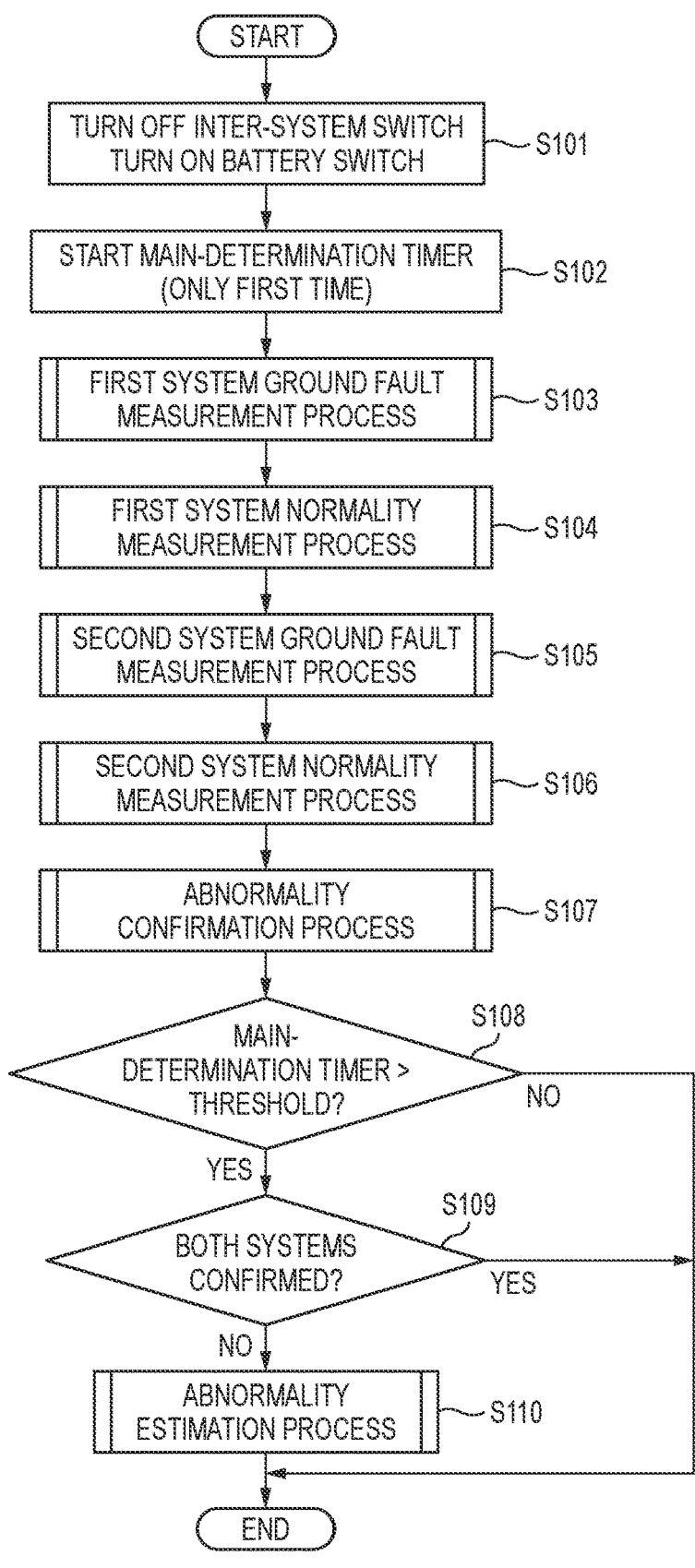
FIG. 10 is a flowchart illustrating an example of a process executed by a controller of a power supply control device according to the embodiment.

In response to temporarily determining that a power supply failure occurs in the first system 110 or the second system 120, the controller 3 starts a process of the main-determination illustrated in FIG. 10. The controller 3 repeats the process illustrated in FIG. 10 until the confirmation and estimation of the abnormal system are completed. The controller 3 includes a main-determination timer. The main-determination timer is a timer that measures the abnormality determination time illustrated in FIGS. 8 and 9.

As illustrated in FIG. 10, the controller 3 turns off the inter-system switch 41 and turns on the battery switch 42 (step S101). Next, the controller 3 starts the main-determination timer (step S102). The controller 3 executes a process of step S102 in the first time to execute the abnormal system determination process. In the second and subsequent abnormal system determination processes, after executing step S101, the controller 3 moves the process to step S103 without executing step S102.

Next, in step S103, the controller 3 executes a first system ground fault measurement process. A specific example of the first system ground fault measurement process will be described later with reference to FIG. 11. Next, the controller 3 executes a first system normality measurement process (step S104). A specific example of the first system normality measurement process will be described later with reference to FIG. 12.

Next, the controller 3 executes a second system ground fault measurement process (step S105). A specific example of the second system ground fault measurement process will be described later with reference to FIG. 13. Next, the controller 3 executes a second system normality measurement process (step S106). A specific example of the second system normality measurement process will be described later with reference to FIG. 14.

Next, the controller 3 executes an abnormality confirmation process (step S107). A specific example of the abnormality confirmation process will be described later with reference to FIGS. 15 and 16. Next, the controller 3 determines whether a measurement time of the main-determination timer exceeds an abnormality determination time, which is a threshold (step S108). The threshold is, for example, 1 s (1000 ms), but is not limited to 1 s.

In response to determining that the measurement time of the main-determination timer does not exceed the threshold (step S108, No), the controller 3 ends the process. Thereafter, the controller 3 starts the abnormal system determination process again from step S101.

In response to determining that the measurement time of the main-determination timer exceeds the threshold (step S108, Yes), the controller 3 determines whether the states of both the first system 110 and the second system 120 are confirmed (step S109). In response to determining that the states of both of the two systems are confirmed (step S109, Yes), the controller 3 ends the process.

Thereafter, the controller 3 starts the abnormal system determination process again from step S101. In response to determining that the states of one or both of the two systems are not confirmed (step S109, No), the controller 3 executes the abnormality estimation process (step S110) and ends the process.

Figure 18:
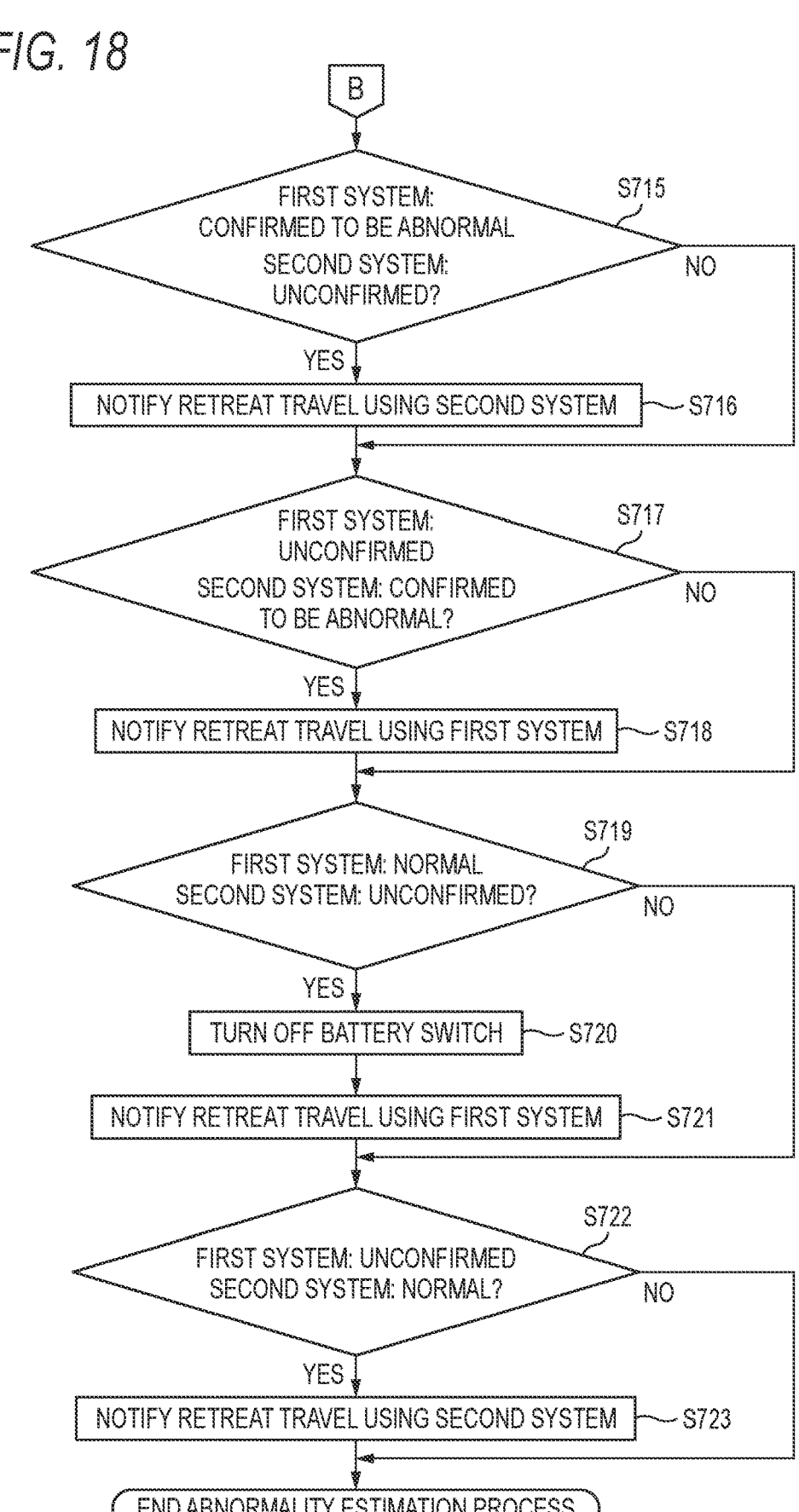
FIG. 18 is a flowchart illustrating an example of a process executed by the controller of the power supply control device according to the embodiment.

A specific example of the abnormality estimation process will be described later with reference to FIGS. 17 and 18. Thereafter, the controller 3 starts the abnormal system determination process again from step S101.

8-2. First System Ground Fault Measurement Process

Figure 11:
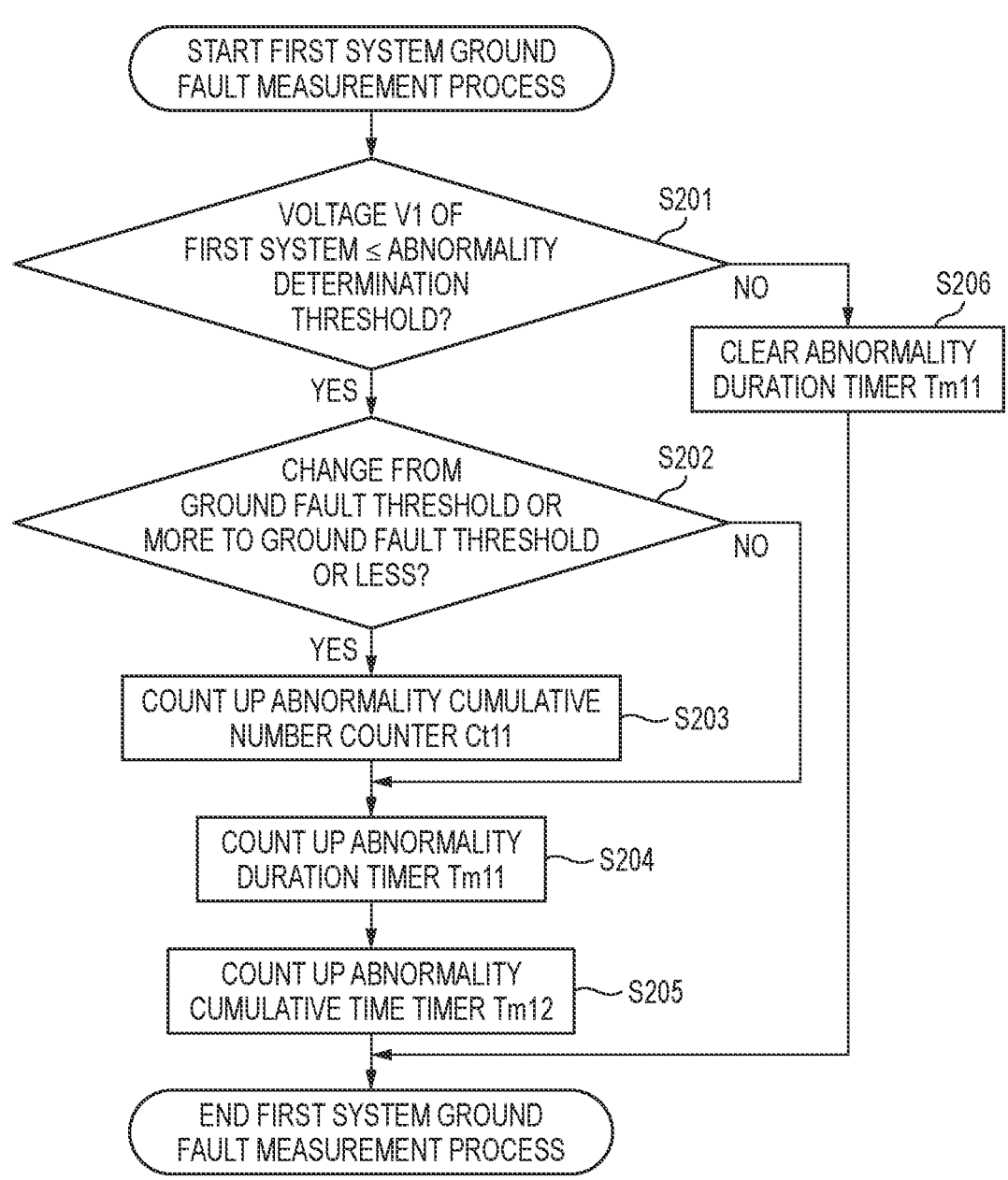
FIG. 11 is a flowchart illustrating an example of a process executed by the controller of the power supply control device according to the embodiment.

The first system ground fault measurement process will be described with reference to FIG. 11. As illustrated in FIG. 11, when the first system ground fault measurement process starts, the controller 3 determines whether a voltage V1 of the first system 110 detected by the first voltage sensor 51 is equal to or smaller than the abnormality determination threshold (step S201). The controller 3 may be configured to determine whether the voltage V1 of the first system 110 detected by the first voltage sensor 51 is less than the abnormality determination threshold, instead of the process of step S201.

In response to determining that the voltage V1 of the first system 110 is not equal to or smaller than the abnormality determination threshold (step S201, No), the controller 3 clears the count value Tm11 of the abnormality duration timer of the first system 110 (step S206).

That is, the controller 3 sets the count value Tm11 of the abnormality duration timer of the first system 110 to "0", and ends the first system ground fault measurement process. Thereafter, the controller 3 moves the process to the first system normality measurement process (step S104) illustrated in FIG. 10.

In response to determining that the voltage V1 of the first system 110 is equal to or smaller than the abnormality determination threshold (step S201, Yes), the controller 3 determines whether a change in the voltage V1 of the first system 110 is a change from the abnormality determination threshold or more to the abnormality determination threshold or less (step S202).

In response to determining that the change in the voltage V1 of the first system 110 is not the change from the abnormality determination threshold or more to the abnormality determination threshold or less (step S202, No), the controller 3 moves the process to step S204.

In response to determining that the change in the voltage V1 of the first system 110 is the change from the abnormality determination threshold or more to the abnormality determination threshold or less (step S202, Yes), the controller 3 moves the process to step S203. In step S203, the controller 3 counts up the count value Ct11 of the abnormality cumulative number counter of the first system 110. That is, the controller 3 adds "1" to the count value Ct11 of the abnormality cumulative number counter of the first system 110.

Next, the controller 3 counts up the count value Tm11 of the abnormality duration timer of the first system 110 (step S204). Next, the controller 3 counts up the count value Tm12 of the abnormality cumulative time timer of the first system 110 (step S205), and ends the first system ground fault measurement process. Thereafter, the controller 3 moves the process to the first system normality measurement process (step S104) illustrated in FIG. 10.

8-3. First System Normality Measurement Process

Figure 12:
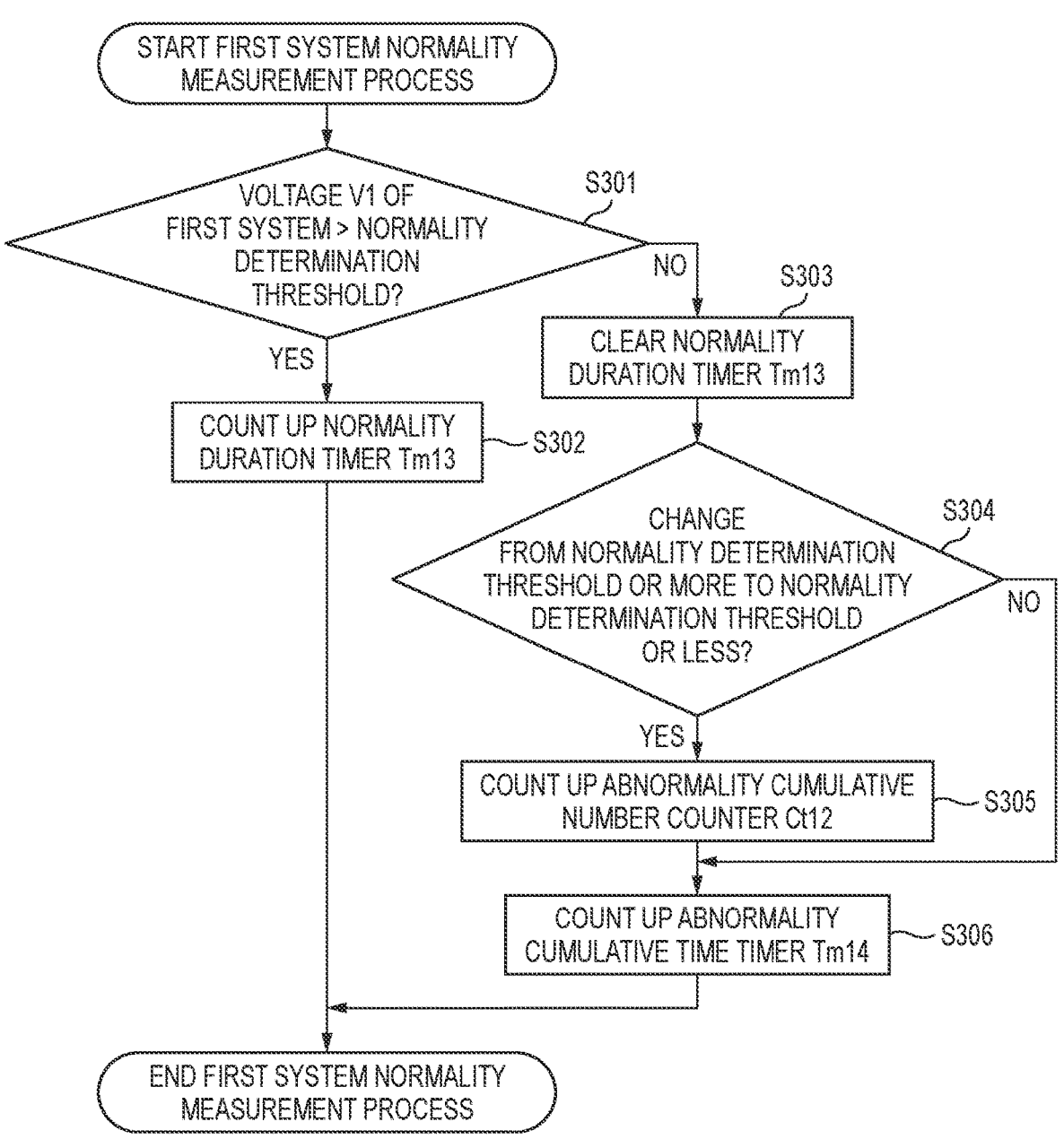
FIG. 12 is a flowchart illustrating an example of a process executed by the controller of the power supply control device according to the embodiment.

The first system normality measurement process will be described with reference to FIG. 12. As illustrated in FIG. 12, when the first system normality measurement process starts, the controller 3 determines whether the voltage V1 of the first system 110 detected by the first voltage sensor 51 exceeds the normality determination threshold (step S301). The controller 3 may be configured to determine whether the voltage V1 of the first system 110 detected by the first voltage sensor 51 is equal to or larger than the normality determination threshold, instead of the process of step S301.

In response to determining that the voltage V1 of the first system 110 exceeds the normality determination threshold (step S301, Yes), the controller 3 counts up the count value Tm13 of the normality duration timer of the first system 110 (step S302), and ends the first system normality measurement process. Thereafter, the controller 3 moves the process to the second system ground fault measurement process (step S105) illustrated in FIG. 10.

In response to determining that the voltage V1 of the first system 110 does not exceed the normality determination threshold (step S301, No), the controller 3 clears the count value Tm13 of the normality duration timer of the first system 110 (step S303). That is, the controller 3 sets the count value Tm13 of the normality duration timer of the first system 110 to "0".

Next, the controller 3 determines whether the change in the voltage V1 of the first system 110 is a change from the normality determination threshold or more to the normality determination threshold or less (step S304). In response to determining that the change in the voltage V1 of the first system 110 is not the change from the normality determination threshold or more to the normality determination threshold or less (step S304, No), the controller 3 moves the process to step S306.

In response to determining that the change in the voltage V1 of the first system 110 is the change from the normality determination threshold or more to the normality determination threshold or less (step S304, Yes), the controller 3 counts up the count value Ct12 of the abnormality cumulative number counter of the first system 110 (step S305). That is, the controller 3 adds "1" to the count value Ct12 of the abnormality cumulative number counter of the first system 110.

Next, the controller 3 counts up the count value Tm14 of the abnormality cumulative time timer of the first system 110 (step S306), and ends the first system normality measurement process. Thereafter, the controller 3 moves the process to the second system ground fault measurement process (step S105) illustrated in FIG. 10.

8-4. Second System Ground Fault Measurement Process

Figure 13:
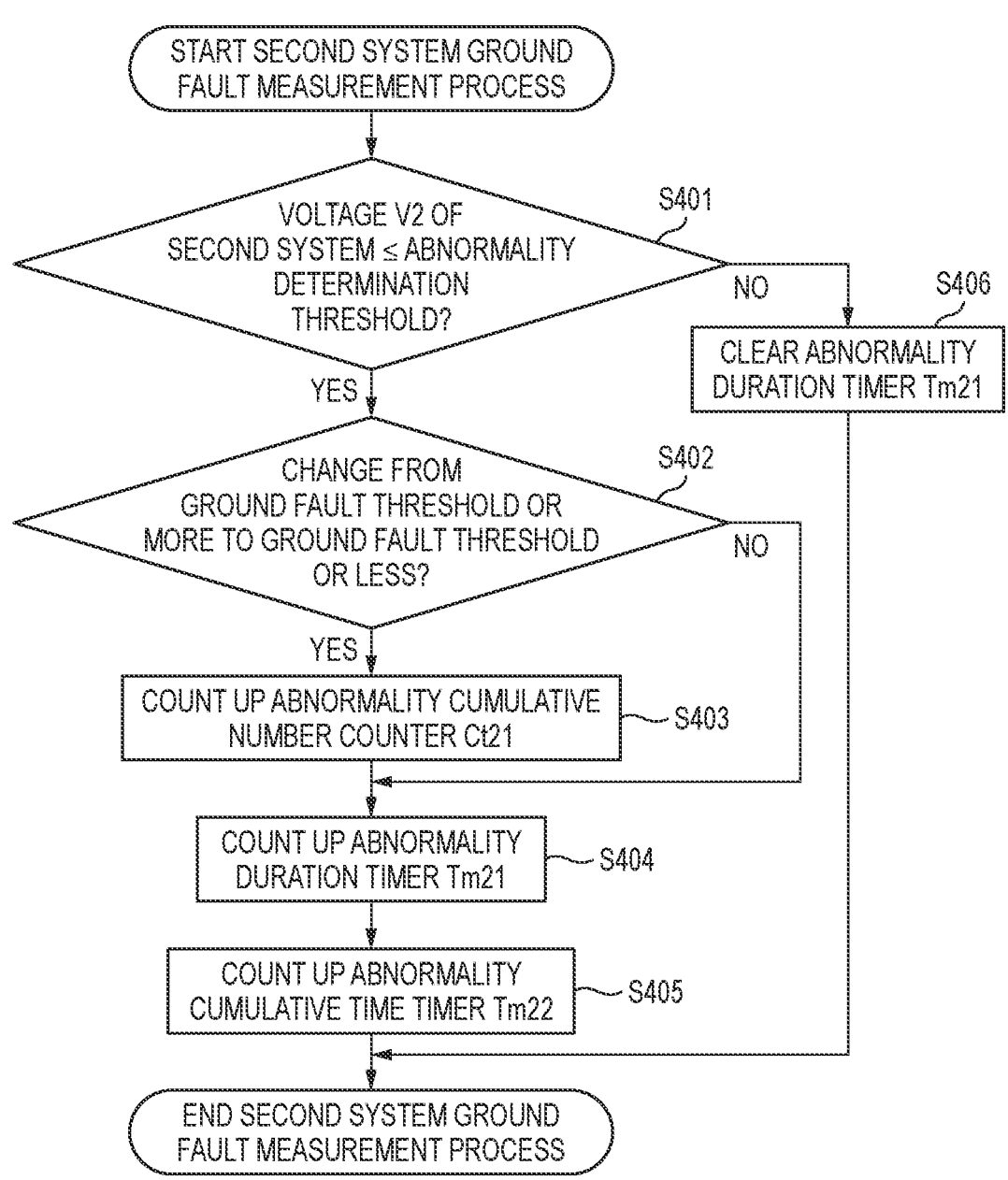
FIG. 13 is a flowchart illustrating an example of a process executed by the controller of the power supply control device according to the embodiment.

The second system ground fault measurement process will be described with reference to FIG. 13. As illustrated in FIG. 13, when the second system ground fault measurement process starts, the controller 3 determines whether a voltage V2 of the second system 120 detected by the second voltage sensor 52 is equal to or smaller than the abnormality determination threshold (step S401). The controller 3 may be configured to determine whether the voltage V2 of the second system 120 detected by the second voltage sensor 52 is less than the abnormality determination threshold, instead of the process of step S401.

In response to determining that the voltage V2 of the second system 120 is not equal to or smaller than the abnormality determination threshold (step S401, No), the controller 3 clears the count value Tm21 of the abnormality duration timer of the second system 120 (step S406).

That is, the controller 3 sets the count value Tm21 of the abnormality duration timer of the second system 120 to "0", and ends the second system ground fault measurement process. Thereafter, the controller 3 moves the process to the second system normality measurement process (step S106) illustrated in FIG. 10.

In response to determining that the voltage V2 of the second system 120 is equal to or smaller than the abnormality determination threshold (step S401, Yes), the controller 3 determines whether a change in the voltage V2 of the second system 120 is a change from the abnormality determination threshold or more to the abnormality determination threshold or less (step S402).

In response to determining that the change in the voltage V2 of the second system 120 is not the change from the abnormality determination threshold or more to the abnormality determination threshold or less (S402, No), the controller 3 moves the process to step S404.

In response to determining that the change in the voltage V2 of the second system 120 is the change from the abnormality determination threshold or more to the abnormality determination threshold or less (step S402, Yes), the controller 3 moves the process to step S403. In step S403, the controller 3 counts up the count value Ct21 of the abnormality cumulative number counter of the second system 120. That is, the controller 3 adds "1" to the count value Ct21 of the abnormality cumulative number counter of the second system 120.

Next, the controller 3 counts up the count value Tm21 of the abnormality duration timer of the second system 120 (step S404). Next, the controller 3 counts up the count value Tm22 of the abnormality cumulative time timer of the second system 120 (step S405), and ends the second system ground fault measurement process. Thereafter, the controller 3 moves the process to the second system normality measurement process (step S106) illustrated in FIG. 10.

8-5. Second System Normality Measurement Process

Figure 14:
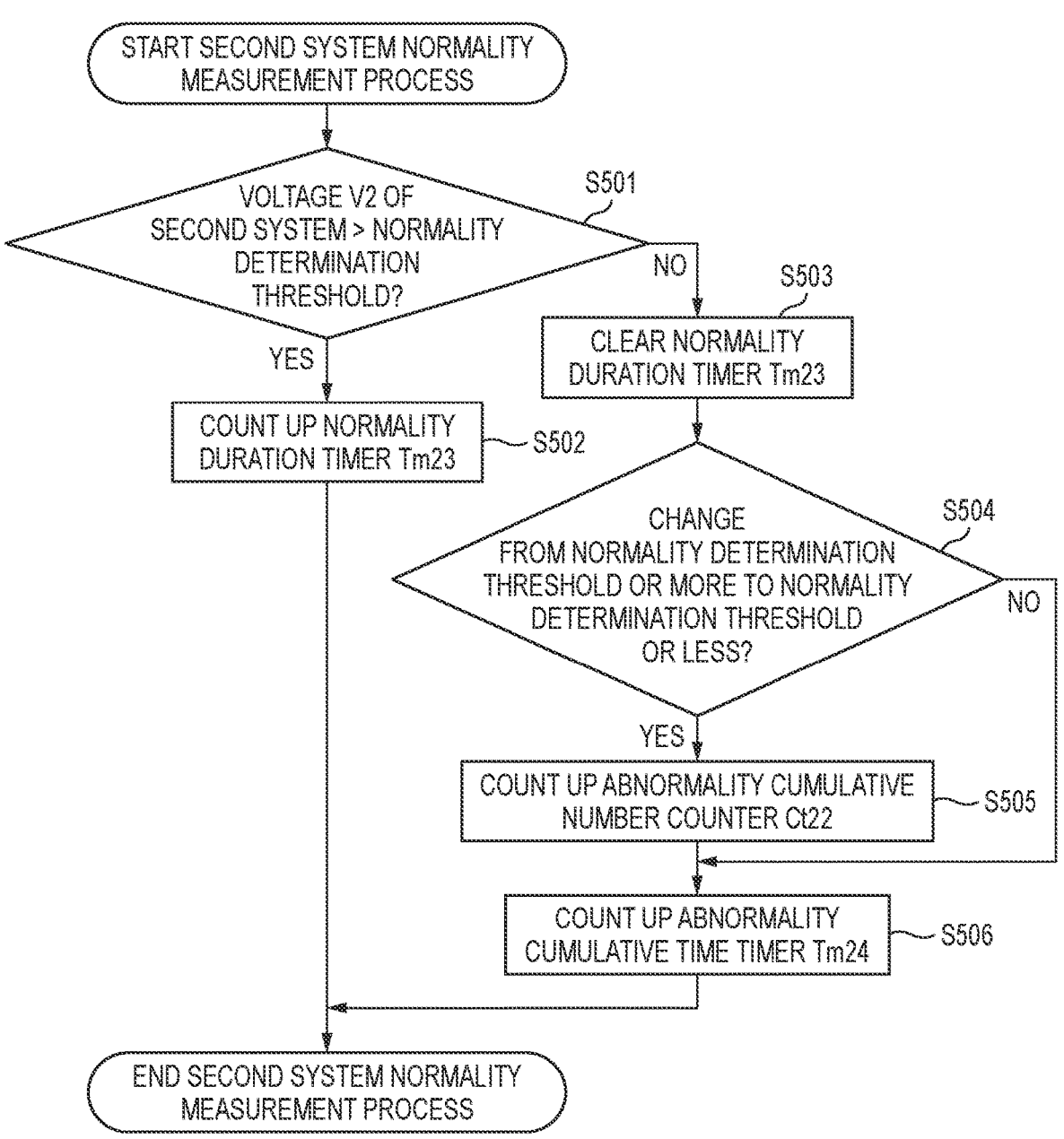
FIG. 14 is a flowchart illustrating an example of a process executed by the controller of the power supply control device according to the embodiment.

The second system normality measurement process will be described with reference to FIG. 14. As illustrated in FIG. 14, when the second system normality measurement process starts, the controller 3 determines whether the voltage V2 of the second system 120 detected by the second voltage sensor 52 exceeds the normality determination threshold (step S501). The controller 3 may be configured to determine whether the voltage V2 of the second system 120 detected by the second voltage sensor 52 is equal to or larger than the normality determination threshold, instead of the process of step S501.

In response to determining that the voltage V2 of the second system 120 exceeds the normality determination threshold (step S501, Yes), the controller 3 counts up the count value Tm23 of the normality duration timer of the second system 120 (step S502), and ends the second system normality measurement process. Thereafter, the controller 3 moves the process to the abnormality confirmation process (step S107) illustrated in FIG. 10.

In response to determining that the voltage V2 of the second system 120 does not exceed the normality determination threshold (step S501, No), the controller 3 clears the count value Tm23 of the normality duration timer of the second system 120 (step S503). That is, the controller 3 sets the count value Tm23 of the normality duration timer of the second system 120 to "0".

Next, the controller 3 determines whether the change in the voltage V2 of the second system 120 is a change from the normality determination threshold or more to the normality determination threshold or less (step S504). In response to determining that the change in the voltage V2 of the second system 120 is not the change from the normality determination threshold or more to the normality determination threshold or less (step S504, No), the controller 3 moves the process to step S506.

In response to determining that the change in the voltage V2 of the second system 120 is the change from the normality determination threshold or more to the normality determination threshold or less (step S504, Yes), the controller 3 counts up the count value Ct22 of the abnormality cumulative number counter of the second system 120 (step S505). That is, the controller 3 adds "1" to the count value Ct22 of the abnormality cumulative number counter of the second system 120.

Next, the controller 3 counts up the count value Tm24 of the abnormality cumulative time timer of the second system 120 (step S506), and ends the second system normality measurement process. Thereafter, the controller 3 moves the process to the abnormality confirmation process (step S107) illustrated in FIG. 10.

8-6. Abnormality Confirmation Process

Figure 15:
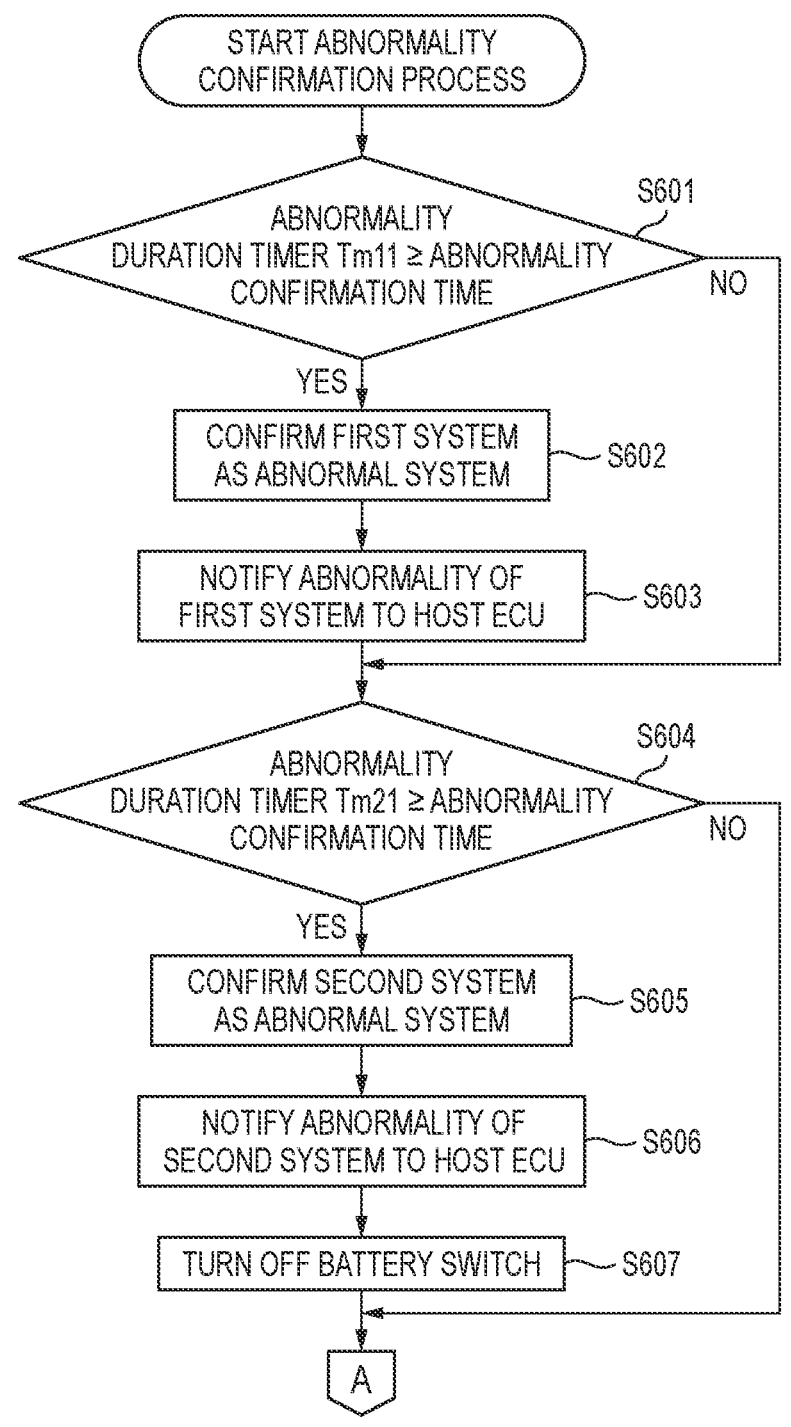
FIG. 15 is a flowchart illustrating an example of a process executed by the controller of the power supply control device according to the embodiment.

The abnormality confirmation process will be described with reference to FIGS. 15 and 16. As illustrated in FIG. 15, when the abnormality confirmation process starts, the controller 3 determines whether the count value Tm11 of the abnormality duration timer of the first system 110 is equal to or larger than the abnormality confirmation time (step S601).

In response to determining that the count value Tm11 of the abnormality duration timer of the first system 110 is not equal to or larger than the abnormality confirmation time (step S601, No), the controller 3 moves the process to step S604.

In response to determining that the count value Tm11 of the abnormality duration timer of the first system 110 is equal to or larger than the abnormality confirmation time (step S601, Yes), the controller 3 confirms the first system 110 as the abnormal system (step S602).

Next, the controller 3 notifies the host ECU that the first system 110 is the abnormal system (step S603). The host ECU is the autonomous driving control device 100. The host ECU may be another ECU such as a central ECU that controls the entire vehicle.

Next, the controller 3 determines whether the count value Tm21 of the abnormality duration timer of the second system 120 is equal to or larger than the abnormality confirmation time (step S604). In response to determining that the count value Tm21 of the abnormality duration timer of the second system 120 is not equal to or larger than the abnormality confirmation time (step S604, No), the controller 3 moves the process to step S608 illustrated in FIG. 16.

In response to determining that the count value Tm21 of the abnormality duration timer of the second system 120 is equal to or larger than the abnormality confirmation time (step S604, Yes), the controller 3 confirms the second system 120 as the abnormal system (step S605).

Next, the controller 3 notifies the host ECU that the second system 120 is the abnormal system (step S606). The host ECU is the autonomous driving control device 100. The host ECU may be another ECU such as a central ECU that controls the entire vehicle.

Figure 16:
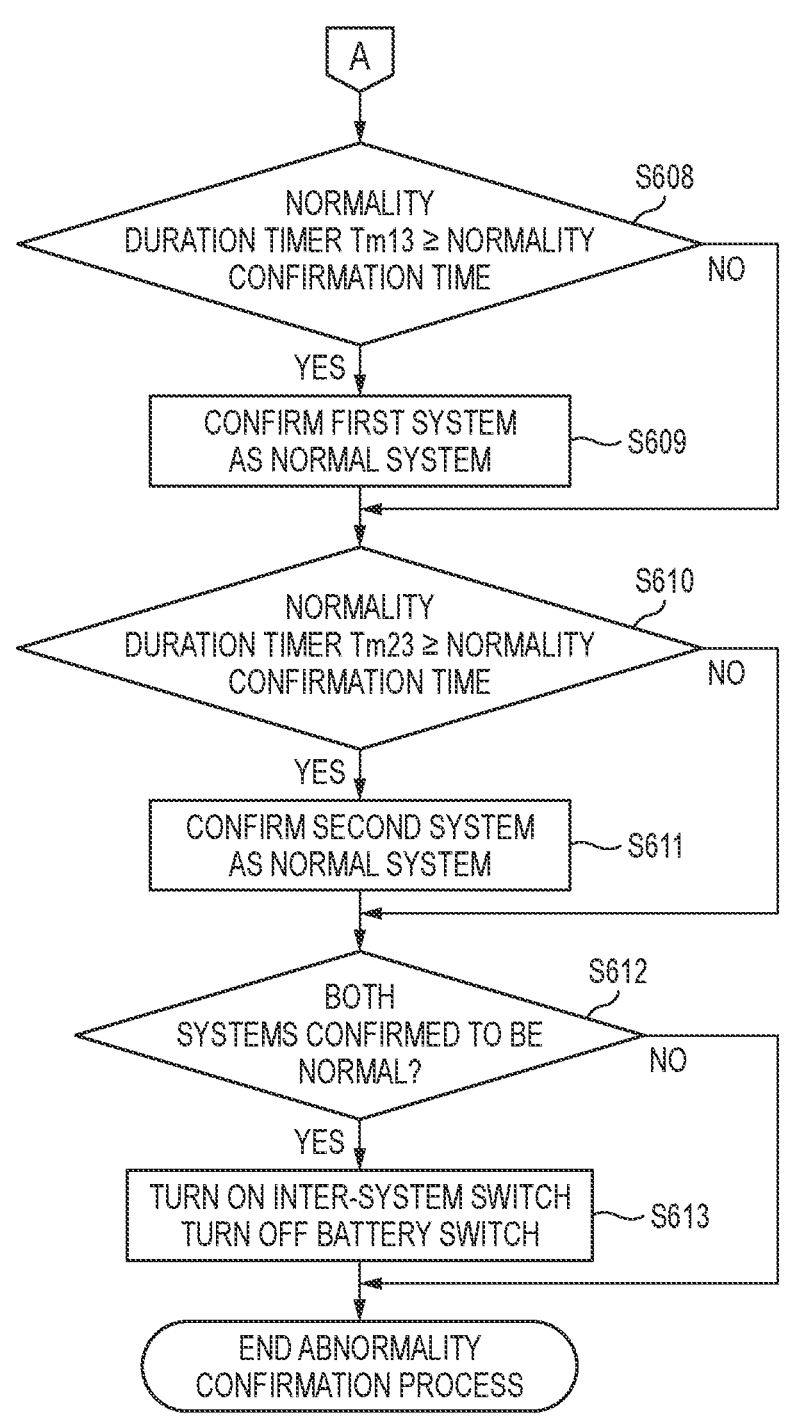
FIG. 16 is a flowchart illustrating an example of a process executed by the controller of the power supply control device according to the embodiment.

Next, the controller 3 turns off the battery switch 42 (step S607), and moves the process to step S608 illustrated in FIG. 16. In step S608, the controller 3 determines whether the count value Tm13 of the normality duration timer of the first system 110 is equal to or larger than the normality confirmation time.

In response to determining that the count value Tm13 of the normality duration timer of the first system 110 is not equal to or larger than the normality confirmation time (step S608, No), the controller 3 moves the process to step S610. In response to determining that the count value Tm13 of the normality duration timer of the first system 110 is equal to or larger than the normality confirmation time (step S608, Yes), the controller 3 confirms the first system 110 as the normal system (step S609).

Next, the controller 3 determines whether the count value Tm23 of the normality duration timer of the second system 120 is equal to or larger than the normality confirmation time (step S610). In response to determining that the count value Tm23 of the normality duration timer of the second system 120 is not equal to or larger than the normality confirmation time (step S610, No), the controller 3 moves the process to step S612.

In response to determining that the count value Tm23 of the normality duration timer of the second system 120 is equal to or larger than the normality confirmation time (step S610, Yes), the controller 3 confirms that the second system 120 is normal (step S611).

The controller 3 determines whether both the first system 110 and the second system 120 are confirmed to be normal systems (step S612). In response to determining that both of the two systems are confirmed to be normal systems (step S612, Yes), the controller 3 turns on the inter-system switch 41 and turns off the battery switch 42 (step S613). Accordingly, the power supply control device 1 returns to a normal state.

In response to determining that one or both of the two systems are not confirmed as the normal system (step S612, No), the controller 3 ends the abnormality confirmation process.

Thereafter, the controller 3 moves the process to step S108 illustrated in FIG. 10.

8-7. Abnormality Estimation Process

The abnormality estimation process will be described with reference to FIGS. 17 and 18. As illustrated in FIG. 17, when the abnormality estimation process starts, the controller 3 determines whether both the first system 110 and the second system 120 are unconfirmed to be abnormal systems or normal systems (step S701). That is, the controller 3 determines whether the first system 110 is unconfirmed to be normal or abnormal, and determines whether the second system 120 is unconfirmed to be normal or abnormal. In response to determining that one or both of the two systems are unconfirmed (step S701, No), the controller 3 moves the process to step S715 illustrated in FIG. 18.

In response to determining that both of two systems are unconfirmed (step S701, Yes), the controller 3 moves the process to step S702. In step S702, the controller 3 determines whether an absolute value of a difference between the count value Tm12 of the abnormality cumulative time timer of the first system 110 and the count value Tm22 of the abnormality cumulative time timer of the second system 120 is larger than a significant difference α (step 702). The significant difference α may be set to any value according to a simulation or a test.

In response to determining that the absolute value is larger than the significant difference α (step S702, Yes), the controller 3 moves the process to step S703. In step S703, the controller 3 determines whether the count value Tm12 of the abnormality cumulative time timer of the first system 110 is larger than the count value Tm22 of the abnormality cumulative time timer of the second system 120.

In response to determining that the count value Tm12 of the abnormality cumulative time timer of the first system 110 is larger than the count value Tm22 of the abnormality cumulative time timer of the second system 120 (step S703, Yes), the controller 3 moves the process to step S704. In step S704, the controller 3 estimates the first system 110 as the abnormal system.

Next, the controller 3 notifies the host ECU that the first system 110 is the abnormal system (step S705). The host ECU is the autonomous driving control device 100. The host ECU may be another ECU such as a central ECU that controls the entire vehicle. Next, the controller 3 moves the process to step S715 illustrated in FIG. 18.

On the other hand, in response to determining, in step S703, that the count value Tm12 of the abnormality cumulative time timer of the first system 110 is not larger than the count value Tm22 of the abnormality cumulative time timer of the second system 120 (step S703, No), the controller 3 moves the process to step S706.

In step S706, the controller 3 estimates the second system 120 as the abnormal system. Next, the controller 3 turns off the battery switch 42 (step S707). Next, the controller 3 notifies the host ECU that the second system 120 is the abnormal system (step S708).

The host ECU is the autonomous driving control device 100. The host ECU may be another ECU such as a central ECU that controls the entire vehicle. Next, the controller 3 moves the process to step S715 illustrated in FIG. 18.

In response to determining in step S702 that the absolute value of the difference between the count value Tm12 of the abnormality cumulative time timer of the first system 110 and the count value Tm22 of the abnormality cumulative time timer of the second system 120 is not larger than the significant difference α (step S702, No), the controller 3 moves the process to step S709.

In step S709, the controller 3 determines whether the count value Tm14 of the abnormality cumulative time timer of the first system 110 is larger than the count value Tm24 of the abnormality cumulative time timer of the second system 120.

In response to determining that the count value Tm14 of the abnormality cumulative time timer of the first system 110 is larger than the count value Tm24 of the abnormality cumulative time timer of the second system 120 (step S709, Yes), the controller 3 moves the process to step S710. In step S710, the controller 3 estimates the first system 110 as the abnormal system.

Next, the controller 3 notifies the host ECU that the first system 110 is the abnormal system (step S711). The host ECU is the autonomous driving control device 100. The host ECU may be another ECU such as a central ECU that controls the entire vehicle. Next, the controller 3 moves the process to step S715 illustrated in FIG. 18.

In response to determining in step S709 that the count value Tm14 of the abnormality cumulative time timer of the first system 110 is not larger than the count value Tm24 of the abnormality cumulative time timer of the second system 120 (step S709, No), the controller 3 moves the process to step S712.

In step S712, the controller 3 estimates the second system 120 as the abnormal system. Next, the controller 3 turns off the battery switch 42 (step S713). Next, the controller 3 notifies the host ECU that the second system 120 is the abnormal system (step S714).

The host ECU is the autonomous driving control device 100. The host ECU may be another ECU such as a central ECU that controls the entire vehicle. Next, the controller 3 moves the process to step S715 illustrated in FIG. 18.

In step S715, the controller 3 determines that the state of the first system 110 is confirmed as abnormal, and determines whether the state of the second system 120 is unconfirmed. When the controller 3 does not determine that the state of the first system 110 is confirmed to be abnormal and does not determine that the state of the second system 120 is unconfirmed (step S715, No), the process proceeds to step S717.

In response to determining that the state of the first system 110 is confirmed to be abnormal and that the state of the second system 120 is unconfirmed (step S715, Yes), the controller 3 notifies the autonomous driving control device 100 of the retreat travel using the second system 120 (step S716).

Next, the controller 3 determines whether the state of the first system 110 is unconfirmed, and whether the state of the second system 120 is confirmed to be abnormal (step S717). When the controller 3 does not determine that the state of the first system 110 is unconfirmed and does not determine that the state of the second system 120 is confirmed to be abnormal (step S717, No), the controller 3 moves the process step S719.

In response to determining that the state of the first system 110 is unconfirmed and determines that the state of the second system 120 is confirmed to be abnormal (step S717, Yes), the controller 3 notifies the autonomous driving control device 100 that the retreat travel using the first system 110 is to be performed (step S718).

Next, the controller 3 determines whether the state of the first system 110 is estimated to be normal and whether the state of the second system 120 is estimated to be unconfirmed (step S719). In response to determining that the state of the first system 110 is not estimated to be normal and the state of the second system 120 is not estimated to be unconfirmed (step S719, No), the controller 3 moves the process to step S722.

In response to determining that the state of the first system 110 is estimated to be normal and the state of the second system 120 is estimated to be unconfirmed (step S719, Yes), the controller 3 turns off the battery switch 42 (step S720). Next, the controller 3 notifies the autonomous driving control device 100 that the retreat travel is to be performed using the first system 110 (step S721).

Next, the controller 3 determines whether the state of the first system 110 is estimated to be unconfirmed and whether the state of the second system 120 is estimated to be normal (step S722). In response to determining that the state of the first system 110 is not estimated to be unconfirmed and the state of the second system 120 is not estimated to be normal (step S722, No), the controller 3 ends the abnormality estimation process.

In response to determining that the state of the first system 110 is estimated to be unconfirmed and the state of the second system 120 is estimated to be normal (step S722, Yes), the controller 3 notifies the autonomous driving control device 100 that the retreat travel is to be performed using the second system 120 (step S723), and ends the abnormality estimation process.

The process illustrated in FIG. 17 is an example and may be changed. The controller 3 may omit the processes of steps S702 and S709 to S714. In this case, in response to determining that both of the two systems are unconfirmed (step S701, Yes), the controller 3 moves the process to step S703.

The controller 3 may omit the processes of steps S702 to S708. In this case, in response to determining that both of the two systems are unconfirmed (step S701, Yes), the controller 3 moves the process to step S709.

8-8. Modification of Abnormality Estimation Process

Figure 19:
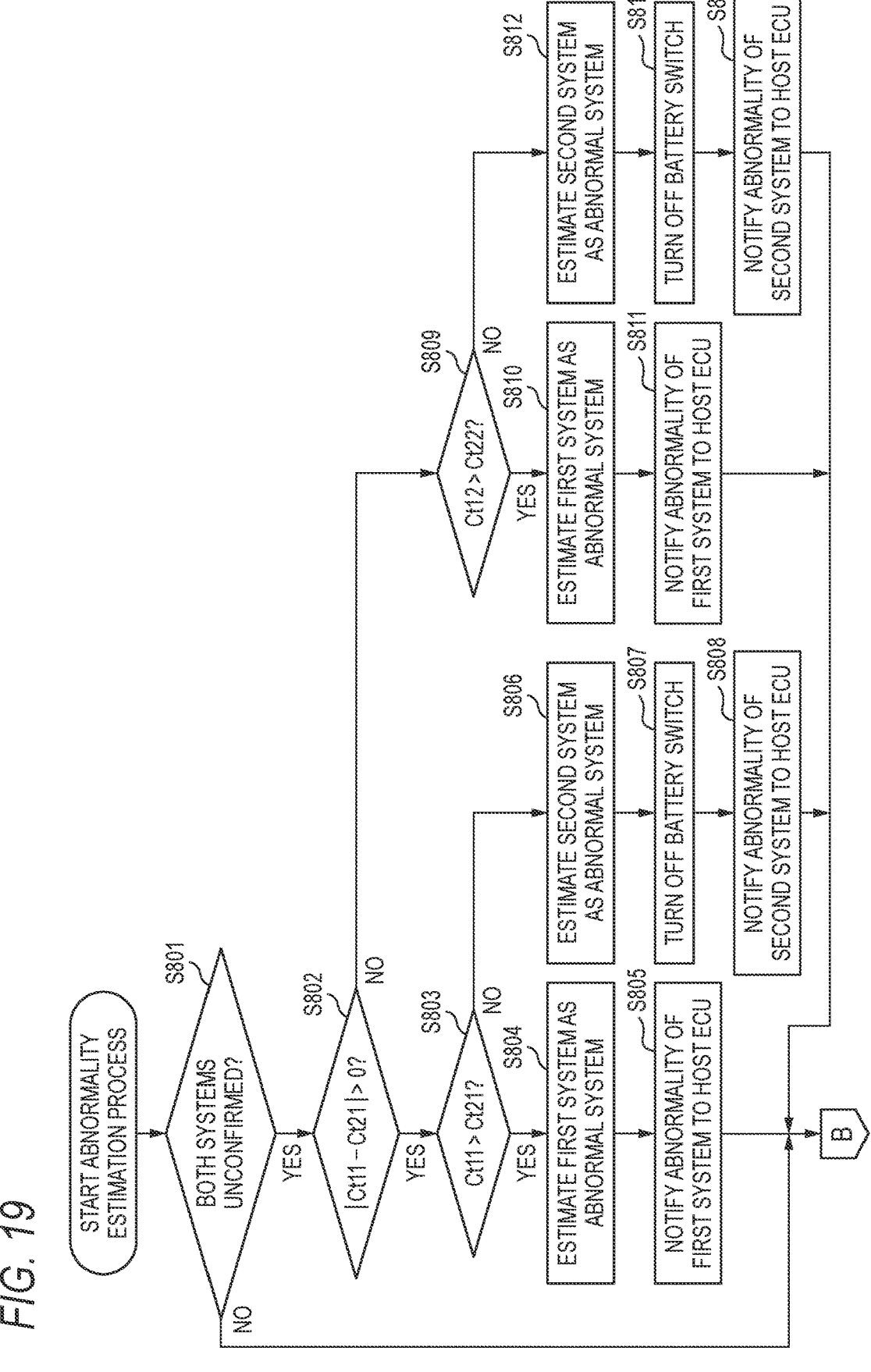
FIG. 19 is a flowchart illustrating an example of a process executed by the controller of the power supply control device according to the embodiment.

An abnormality estimation process according to a modification will be described with reference to FIG. 19. As illustrated in FIG. 19, when the abnormality estimation process according to the modification starts, the controller 3 determines whether both the first system 110 and the second system 120 are unconfirmed to be abnormal systems or normal systems (step S801). When the controller 3 determines that one or both of the two systems are unconfirmed (step S801, No), the process proceeds to step S715 illustrated in FIG. 18.

In response to determining that both of the two systems are unconfirmed (step S801, Yes), the controller 3 moves the process to step S802. In step S802, the controller 3 determines whether an absolute value of a difference between the count value Ct11 of the abnormality cumulative number counter of the first system 110 and the count value Ct21 of the abnormality cumulative number counter of the second system 120 is larger than 0 (step 802).

In response to determining that the absolute value is larger than 0 (step S802, Yes), the controller 3 moves the process to step S803. In step S803, the controller 3 determines whether the count value Ct11 of the abnormality cumulative number counter of the first system 110 is larger than the count value Ct21 of the abnormality cumulative number counter of the second system 120.

In response to determining that the count value Ct11 of the abnormality cumulative number counter of the first system 110 is larger than the count value Ct21 of the abnormality cumulative number counter of the second system 120 (step S803, Yes), the controller 3 moves the process to step S804. In step S804, the controller 3 estimates the first system 110 as the abnormal system.

Next, the controller 3 notifies the host ECU that the first system 110 is the abnormal system (step S805). The host ECU is the autonomous driving control device 100. The host ECU may be another ECU such as a central ECU that controls the entire vehicle. Next, the controller 3 moves the process to step S715 illustrated in FIG. 18.

On the other hand, in response to determining in step S803 that the count value Ct11 of the abnormality cumulative number counter of the first system 110 is not larger than the count value Ct21 of the abnormality cumulative number counter of the second system 120 (step S803, No), the controller 3 moves the process to step S806.

In step S806, the controller 3 estimates the second system 120 as the abnormal system. Next, the controller 3 turns off the battery switch 42 (step S807). Next, the controller 3 notifies the host ECU that the second system 120 is the abnormal system (step S808).

The host ECU is the autonomous driving control device 100. The host ECU may be another ECU such as a central ECU that controls the entire vehicle. Next, the controller 3 moves the process to step S715 illustrated in FIG. 18.

In response to determining in step S802 that the absolute value of the difference between the count value Ct11 of the abnormality cumulative number counter of the first system 110 and the count value Ct21 of the abnormality cumulative number counter of the second system 120 is not larger than 0 (step S802, No), the controller 3 moves the process to step S809.

In step S809, the controller 3 determines whether the count value Ct12 of the abnormality cumulative number counter of the first system 110 is larger than the count value Ct22 of the abnormality cumulative number counter of the second system 120.

In response to determining that the count value Ct12 of the abnormality cumulative number counter of the first system 110 is larger than the count value Ct22 of the abnormality cumulative number counter of the second system 120 (step S809, Yes), the controller 3 moves the process to step S810. In step S810, the controller 3 estimates the first system 110 as the abnormal system.

Next, the controller 3 notifies the host ECU that the first system 110 is the abnormal system (step S811). The host ECU is the autonomous driving control device 100. The host ECU may be another ECU such as a central ECU that controls the entire vehicle. Next, the controller 3 moves the process to step S715 illustrated in FIG. 18.

In response to determining in step S809 that the count value Ct12 of the abnormality cumulative number counter of the first system 110 is not larger than the count value Ct22 of the abnormality cumulative number counter of the second system 120 (step S809, No), the controller 3 moves the process to step S812.

In step S812, the controller 3 estimates the second system 120 as the abnormal system. Next, the controller 3 turns off the battery switch 42 (step S813). Next, the controller 3 notifies the host ECU that the second system 120 is the abnormal system (step S814).

The host ECU is the autonomous driving control device 100. The host ECU may be another ECU such as a central ECU that controls the entire vehicle. Next, the controller 3 moves the process to step S715 illustrated in FIG. 18. Thereafter, the controller 3 executes the processes of steps S715 to S723 illustrated in FIG. 18 and ends the abnormality estimation process.

The process illustrated in FIG. 19 is an example and may be changed. The controller 3 may omit the processes of steps S802 and S809 to S814. In this case, in response to determining that both of the two systems are unconfirmed (step S801, Yes), the controller 3 moves the process to step S803.

The controller 3 may omit the processes of steps S802 to S808. In this case, in response to determining that both of the two systems are unconfirmed (step S801, Yes), the controller 3 moves the process to step S809.

9. Power Supply Control Device According to Modification

Figure 20:
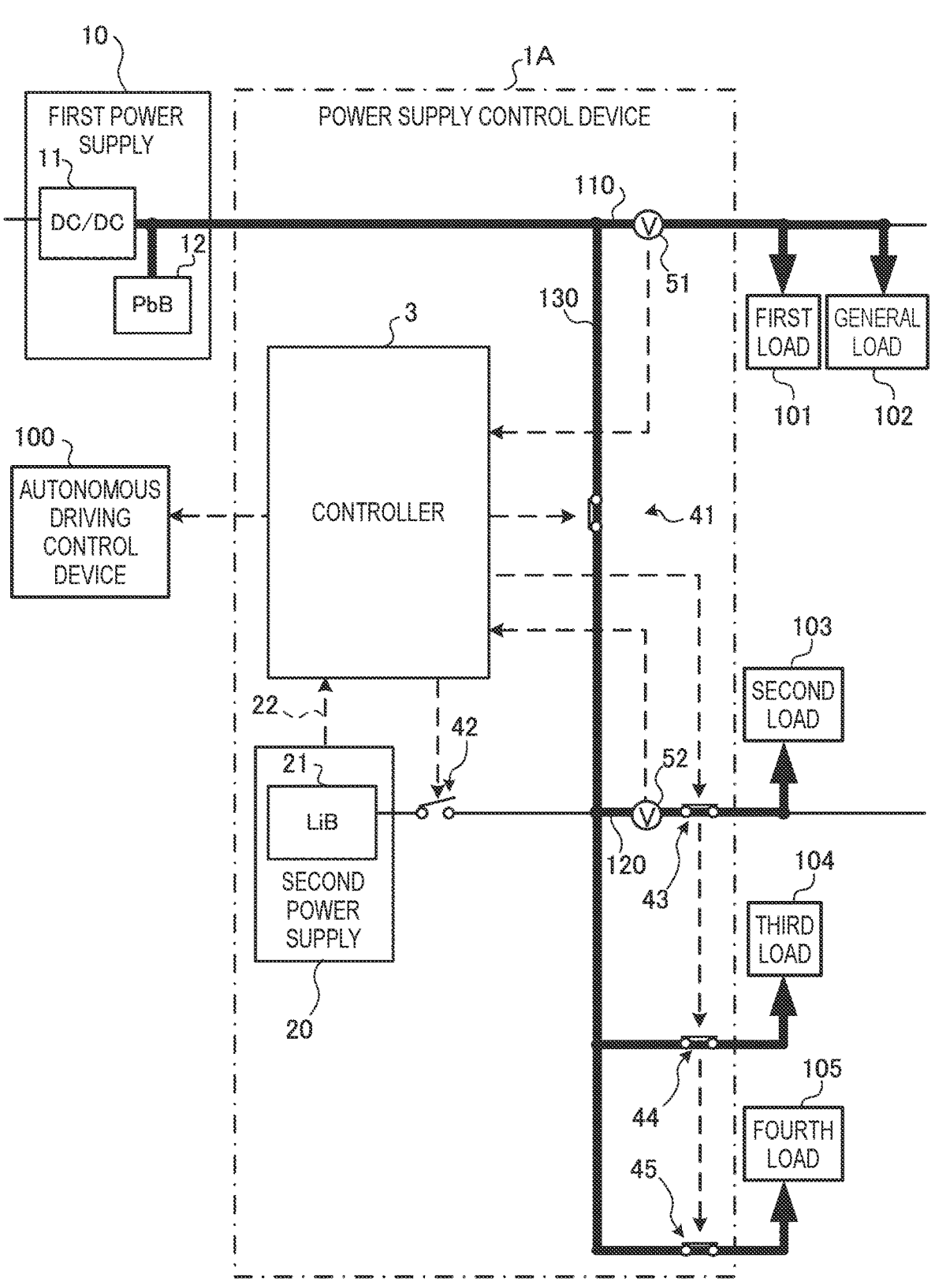
FIG. 20 is a diagram illustrating a configuration and an operation of a power supply control device according to a modification of the embodiment.

FIG. 20 is a diagram illustrating a configuration and an operation of a power supply control device according to a modification of the embodiment. As illustrated in FIG. 20, the power supply control device 1A is connected to a third load 104 and a fourth load 105 in addition to the first load 101, the general load 102, and the second load 103.

A first load switch 43 is provided between the second system 120 and the second load 103. A second load switch 44 is provided between the second system 120 and the third load 104. A third load switch 45 is provided between the second system 120 and the fourth load 105.

When the controller 3 confirms or estimates that the second system 120 is the abnormal system according to the above-mentioned confirmation process or the estimation process, the controller 3 turns off the first to third load switches 43 to 45 one by one from a state where all of the first to third load switches 43 to 45 are turned on.

When the voltage of the second system 120 detected by the second voltage sensor 52 increases when the first to third load switches 43 to 45 are turned off one by one, the controller 3 determines that a ground fault occurs on a load side of the load switch which is turned off at that time. The controller 3 turns off again the load switch which is determined to have a ground fault on the load side.

Accordingly, when the second system 120 is confirmed or estimated as the abnormal system, the controller 3 may continue an operation of a load which is not related to the ground fault among the second to fourth loads 103 to 105 connected to the second system 120.

10. Appendix

As an appendix, the features of the present invention are illustrated below.

(1) A power supply control device including:
   a connection device provided in an inter-system line that connects a first system that supplies electric power from a first power supply to a first load and a second system that supplies electric power from a second power supply to a second load; and
   a controller configured to control the connection device,
   in which
   the controller is configured to
      control the connection device to cut off the inter-system line in response to a power supply failure of the first system or the second system being detected,
   execute a confirmation process for confirming a failed system based on a change in a voltage of the first system and a change in a voltage of the second system in a first period, and
      execute, in a case where the failed system cannot be confirmed in the confirmation process, an estimation process for estimating, as an abnormal system, a system with a greater possibility to be abnormal among the first system and the second system, based on a change in a voltage of the first system and a change in a voltage of the second system in a second period longer than the first period.

(2) The power supply control device according to (1), in which,
   as the estimation process, the controller is configured to measure a cumulative time when the voltage of the first system is equal to or smaller than an abnormality determination threshold and a cumulative time when the voltage of the second system is equal to or smaller than the abnormality determination threshold, and estimate a system having a longer cumulative time among the first system and the second system, as the abnormal system.

(3) The power supply control device according to (1), in which, as the estimation process, the controller is configured to measure a cumulative time when the voltage of the first system is equal to or smaller than a normality determination threshold and a cumulative time when the voltage of the second system is equal to or smaller than the normality determination threshold, and estimate a system having a longer cumulative time among the first system and the second system, as the abnormal system.

(4) The power supply control device according to (1), in which, as the estimation process, the controller is configured to measure a cumulative time when the voltage of the first system is equal to or smaller than an abnormality determination threshold and a cumulative time when the voltage of the second system is equal to or smaller than the abnormality determination threshold, measure a cumulative time when the voltage of the first system is equal to or smaller than a normality determination threshold and a cumulative time when the voltage of the second system is equal to or smaller than the normality determination threshold, and estimate a system having the longer cumulative time when the voltage is equal to or smaller than the abnormality determination threshold, as the abnormal system, and the controller is configured to estimate, in a case where the abnormal system cannot be estimated in the estimation process, the system having a longer cumulative time when the voltage is equal to or smaller than the normality determination threshold among the first system and the second system, as the abnormal system.

(4) The power supply control device according to (1), in which, as the estimation process, the controller is configured to perform a first estimation process including measuring a cumulative time when the voltage of the first system is equal to or smaller than an abnormality determination threshold and a cumulative time when the voltage of the second system is equal to or smaller than the abnormality determination threshold and estimating a system having the longer cumulative time as the abnormal system, perform a second estimation process including measuring a cumulative time when the voltage of the first system is equal to or smaller than a normality determination threshold and a cumulative time when the voltage of the second system is equal to or smaller than the normality determination threshold and estimating a system having the longer cumulative time as the abnormal system, estimate the abnormal system based on the first estimation process, and estimate, in a case where the abnormal system cannot be estimated based on the first estimation process, the abnormal system based on the second estimation process.

(5) The power supply control device according to (1), in which, as the estimation process, the controller is configured to measure the number of times the voltage of the first system is equal to or smaller than an abnormality determination threshold and the number of times the voltage of the second system is equal to or smaller than the abnormality determination threshold, and estimate a system having the larger number of times among the first system and the second system, as the abnormal system.

(6) The power supply control device according to (1), in which, as the estimation process, the controller is configured to measure the number of times the voltage of the first system is equal to or smaller than a normality determination threshold and the number of times the voltage of the second system is equal to or smaller than the normality determination threshold, and estimate a system having the smaller number of times among the first system and the second system, as the abnormal system.

(7) The power supply control device according to (1), in which, as the estimation process, the controller is configured to perform a third estimation process including measuring the number of times the voltage of the first system is equal to or smaller than an abnormality determination threshold and the number of times the voltage of the second system is equal to or smaller than the abnormality determination threshold and estimating a system having the larger number of times the voltage is equal to or smaller than the abnormality determination threshold among the first system and the second system as the abnormal system, perform a fourth estimation process including measuring the number of times the voltage of the first system is equal to or smaller than a normality determination threshold and the number of times the voltage of the second system is equal to or smaller than the normality determination threshold and estimating a system having the smaller number of times the voltage is equal to or smaller than the normality determination threshold among the first system and the second system as the abnormal system, and estimate the abnormal system based on the third estimation process, and estimate, in a case where the abnormal system cannot be estimated based on the third estimation process, the abnormal system based on the fourth estimation process.

(8) The power supply control device according to (1), in which the controller is configured to execute the confirmation process and the estimation process again in response to the system with the greater possibility to be abnormal being estimated as the abnormal system.

(9) A power supply control method including:

by a controller of a power supply control device, the power supply control device including a connection device provided in an inter-system line that connects a first system that supplies electric power from a first power supply to a first load and a second system that supplies electric power from a second power supply to a second load and the controller configured to control the connection device, controlling the connection device to cut off the inter-system line in response to a power supply failure of the first system or the second system being detected, executing a confirmation process for confirming a failed system based on a change in a voltage of the first system and a change in a voltage of the second system in a first period, and executing, in a case where the failed system cannot be confirmed in the confirmation process, an estimation process for estimating, as an abnormal system, a system with a greater possibility to be abnormal among the first system and the second system, based on a change in a voltage of the first system and a change in a voltage of the second system in a second period longer than the first period.

Further effects and modifications may be easily derived by those skilled in the art. Therefore, broader aspects of the present invention are not limited to the specific details and representative embodiments illustrated and described above. Therefore, various modifications may be made without departing from the spirit or scope of the general inventive concept as defined by the appended claims and equivalents thereof.

What is claimed is:

1. A power supply control device comprising:

a connection device provided in an inter-system line that connects a first system that supplies electric power from a first power supply to a first load and a second system that supplies electric power from a second power supply to a second load; and a controller configured to control the connection device, wherein the controller is configured to control the connection device to cut off the inter-system line in response to a voltage of the first system or the second system being smaller than a first threshold, and execute, after the inter-system line is cut off, a confirmation process for both the first system and the second system in which the controller (i) determines, as a failed system, a system a voltage of which is smaller than a second threshold for a first period or longer and (ii) determines, as a normal system, a system a voltage of which is greater than a third threshold for a second period or longer, wherein (i) in a case where one of the first and second systems is confirmed as the failed system and the other of the first and second systems is confirmed as the normal system, the controller is configured to cause a vehicle to which the power supply control device is mounted to perform retreat travel using the other of the first and second systems that is confirmed as the normal system, (ii) in a case where one of the first and second systems is confirmed as the failed system and the other of the first and second systems is not confirmed as either the failed system or the normal system, the controller is configured to cause the vehicle to which the power supply control device is mounted to perform the retreat travel using the other of the first and second systems that is not confirmed as the failed system, and (iii) in a case where both of the first and second systems are not confirmed as either the failed system or the normal system, the controller is configured to execute an estimation process for estimating, as an abnormal system, a system with a greater possibility to be abnormal among the first system and the second system, based on a change in a voltage of the first system and a change in a voltage of the second system in a third period longer than the first period, and cause the vehicle to perform the retreat travel using a system that is not estimated as the abnormal system among the first system and the second system.

2. The power supply control device according to claim 1, wherein the controller is configured to perform the retreat travel without executing the estimation process in (ii).

3. A power supply control method executed by a controller of a power supply control device, the power supply control device including a connection device provided in an inter-system line that connects a first system that supplies electric power from a first power supply to a first load and a second system that supplies electric power from a second power supply to a second load, the controller being configured to control the connection device, and the method comprising:

controlling the connection device to cut off the inter-system line in response to a voltage of the first system or the second system being smaller than a first threshold;

executing, after the inter-system line is cut off, a confirmation process for both the first system and the second system in which the controller (i) determines, as a failed system, a system a voltage of which is smaller than a second threshold for a first period or longer and (ii) determines, as a normal system, a system a voltage of which is greater than a third threshold for a second period or longer;

(i) in a case where one of the first and second systems is confirmed as the failed system and the other of the first and second systems is confirmed as the normal system, causing a vehicle to which the power supply control device is mounted to perform retreat travel using the other of the first and second systems that is confirmed as the normal system;

(ii) in a case where one of the first and second systems is confirmed as the failed system and the other of the first and second systems is not confirmed as either the failed system or the normal system, causing the vehicle to which the power supply control device is mounted to perform the retreat travel using the other of the first and second systems that is not confirmed as the failed system; and (iii) in a case where both of the first and second systems are not confirmed as either the failed system or the normal system, executing an estimation process for estimating, as an abnormal system, a system with a greater possibility to be abnormal among the first system and the second system, based on a change in a voltage of the first system and a change in a voltage of the second system in a third period longer than the first period, and causing the vehicle to perform the retreat travel using a system that is not estimated as the abnormal system among the first system and the second system.

4. The power supply control method according to claim 3, wherein the retreat travel is performed without executing the estimation process in (ii).

* * * * *